US012282839B2

United States Patent
Fadaie et al.

(10) Patent No.: US 12,282,839 B2
(45) Date of Patent: Apr. 22, 2025

(54) CONSTRAINT BASED INFERENCE AND MACHINE LEARNING SYSTEM

(71) Applicant: The Boeing Company, Chicago, IL (US)

(72) Inventors: Joshua G. Fadaie, Saint Louis, MO (US); Richard Hanes, Ballwin, MO (US)

(73) Assignee: The Boeing Company, Arlington, VA (US)

( * ) Notice: Subject to any disclaimer, the term of this patent is extended or adjusted under 35 U.S.C. 154(b) by 827 days.

(21) Appl. No.: 17/529,067

(22) Filed: Nov. 17, 2021

(65) Prior Publication Data
US 2022/0164636 A1 May 26, 2022

Related U.S. Application Data

(60) Provisional application No. 63/118,495, filed on Nov. 25, 2020.

(51) Int. Cl.
*G06N 3/047* (2023.01)
*G05B 13/02* (2006.01)
*G06N 3/045* (2023.01)

(52) U.S. Cl.
CPC .......... *G06N 3/047* (2023.01); *G05B 13/027* (2013.01); *G06N 3/045* (2023.01)

(58) Field of Classification Search
CPC ....... G06N 3/047; G06N 3/045; G05B 13/027
See application file for complete search history.

(56) References Cited

U.S. PATENT DOCUMENTS

| 2018/0120843 | A1* | 5/2018 | Berntorp | G06V 20/56 |
| 2018/0307745 | A1* | 10/2018 | Bachrach | G06N 3/006 |
| 2019/0220652 | A1* | 7/2019 | Li | G06F 21/32 |

(Continued)

OTHER PUBLICATIONS

GitHub.com: allenai/allennlp; An explanation of the masked-softmax technique: https://github.com/allenai/allennlp/blob/b6cc9d39651273e8ec2a7e334908ffa9de5c2026/allennlp/nn/util.py#L272-L303; Retrieved from the Internet Nov. 11, 2021 (28 pages).

(Continued)

*Primary Examiner* — David E Choi
(74) *Attorney, Agent, or Firm* — Alleman Hall & Tuttle LLP

(57) ABSTRACT

A method including receiving a pre-determined constraint on user actions. A constraint vector is generated based on the pre-determined constraint. The constraint vector is input into a machine learning model. A first output is generated from the machine learning model by executing the machine learning model using the constraint vector as a first input to the machine learning model. The constraint vector is converted into a legal action mask. A probability vector is generated by executing a masked softmax operator. The masked softmax operator takes, as a second input, the first output. The masked softmax operator takes, as a third input, the legal action mask. The masked softmax operator generates, as a second output, the probabilities vector. Action outputs are generated by applying a sampling system to the probability vector. The action outputs include a subset of the user actions, and wherein the subset includes only allowed user actions.

20 Claims, 18 Drawing Sheets

(56) References Cited

U.S. PATENT DOCUMENTS

| | | | | |
|---|---|---|---|---|
| 2019/0354858 | A1* | 11/2019 | Chrzanowski | G06N 20/00 |
| 2019/0370660 | A1* | 12/2019 | Wong | G06N 3/048 |
| 2020/0233920 | A1* | 7/2020 | Meeds | G06V 20/698 |
| 2020/0394559 | A1* | 12/2020 | Zhang | G06N 20/00 |
| 2021/0064983 | A1* | 3/2021 | Mai | G06N 3/08 |
| 2021/0295200 | A1* | 9/2021 | Saito | G06F 40/103 |
| 2021/0374343 | A1* | 12/2021 | Li | G06F 16/90332 |
| 2021/0374352 | A1* | 12/2021 | Li | G06N 20/00 |
| 2021/0406765 | A1* | 12/2021 | Zhang | G06N 3/047 |
| 2022/0164636 | A1* | 5/2022 | Fadaie | G06N 20/00 |
| 2023/0308621 | A1* | 9/2023 | Chupeau | G06T 3/40 |

OTHER PUBLICATIONS

Silver, D. et al., "Mastering Chess and Shogi by Self-Play with a General Reinforcement Learning Algorithm"; https://arxiv.org/pdf/1712.01815v1 [cs.AI] Dec. 5, 2017 (19 pages).

Reddit—Explanation of masking/softmax-masking techniques; "Question about AlphaGo Zero: r/reinforcementlearning"; https://www.reddit.com/r/reinforcementlearning/comments/80pca7/question_about_alphago_zero/duxlj8y/; Retrieved Nov. 11, 2021 (13 pages).

\* cited by examiner

1000 — *Constraint-based Inference and Learning Algorithm*

1002 — – Long_term_store = Store();
1004 — – Mission_constraints = get_general_mission_constraints(); // From a system/human analyzing mission
— – Engagement.start(); // If simulated this resets the 'virtual environment'
1006 — – Repeat(until Engagement.done() == True):
1008 — ○ // Query Operator/Commander for Constraints
 ○ Operator_obs = Operator.get_observations() // Sensor & comms data
 ○ Real_time_constraints = Operator.get_realtime_masks(operator_obs)
 ○ Human_constraints = Operator.get_human_masks(
  ▪ operator_obs, mission_constraints, Real_time_constraints);
 ○ Operator_Constraints = Operator.merge_constraints(
  ▪ human_constraints, mission_constraints, realtime_constraints)
 ○ Operator.transmit(operator_constraints) // RxTx Communication of applicable constraints to wingman
1010 — ○ // Receive and handle constraints per controlled wingmen platforms
 ○ All_actions = list()
 ○ For Wingman in Platforms.wingmen:
  ▪ Operator_constraints = Wingman.receive_operator_masks() // RxTx
  ▪ Local_observations = Wingman.get_observations()
  ▪ Wingman_masks = Wingman.get_masks(local_observations, operator_constraints)
  ▪ Actions = Wingman.policy.act(wingman_masks, local_observations)
  ▪ All_actions.append(actions)
  ▪ // Timestep used to synchronize data collected from different sources. Primarily useful
  ▪ // if models and environment is simulated.
  ▪ Long_term_store.store(utils.get_time_step(), actions, local_observations, wingman_masks)
 ○ rewards = Engagement.step(all_actions);
 ○ Long_term_store.store(utils.get_time_step(), rewards);
1012 — – Train.update(long_term_store, Platforms.wingmen); // can be done locally or on a different processors

FIG. 10

UI - STEP 1

UI - STEP 2

CONSTRAINT BASED INFERENCE AND MACHINE LEARNING SYSTEM

RELATED APPLICATIONS

This application claims priority to U.S. Provisional Patent Application 63/118,495, filed Nov. 25, 2020, the entirety of which is hereby incorporated by reference.

STATEMENT REGARDING FEDERALLY SPONSORED RESEARCH OR DEVELOPMENT

This invention was made with U.S. Government support under DARPA SI3-CMD contract 18099-190230-US awarded by the Defense Advanced Research Projects Agency. The Government may have certain rights in this invention.

BACKGROUND

Machine learning models can be effective at discovering hidden patterns or relationships within data. However, because it is not well understood exactly how machine learning algorithms find such hidden patterns or relationships, it is likewise difficult to constrain a machine learning model's operational workings.

SUMMARY

The one or more embodiments provides for a method. The method includes receiving a pre-determined constraint on user actions. The method also includes generating a constraint vector based on the pre-determined constraint. The method also includes inputting the constraint vector into a machine learning model. The method also includes generating a first output from the machine learning model by executing the machine learning model using the constraint vector as a first input to the machine learning model. The method also includes converting the constraint vector into a legal action mask. The method also includes generating a probability vector by executing a masked softmax operator. The masked softmax operator takes, as a second input, the first output. The masked softmax operator takes, as a third input, the legal action mask. The masked softmax operator generates, as a second output, the probabilities vector. The method also includes generating action outputs by applying a sampling system to the probability vector. The action outputs include a subset of the user actions. The subset includes only allowed user actions.

The one or more embodiments also includes another method. The method includes receiving a pre-determined constraint on user actions. The method also includes converting the pre-determined constraint into a first machine learning vector. The method also includes receiving, from a user interface, a user-designated constraint to the user actions, the user-designated constraint received from a user. The method also includes converting the user-designated constraint into a second machine learning vector. The method also includes generating a constraint vector by concatenating the first machine learning vector and the second machine learning vector. The method also includes inputting the constraint vector into a first machine learning model. The method also includes generating a first output from the first machine learning model by executing the first machine learning model using the constraint vector as a first input to first the machine learning model. The method also includes converting the constraint vector into a legal action mask. The method also includes generating a first probability vector by executing a masked softmax operator. The masked softmax operator takes, as a second input, the first output. The masked softmax operator takes, as a third input, the legal action mask. The masked softmax operator generates, as a second output, the first probabilities vector. The method also includes generating action outputs by applying a sampling system to the first probabilities vector. The action outputs include a subset of the user actions. The subset includes only allowed user actions. The method also includes transmitting the constraint vector to a second vehicle operated by a second user. The method also includes calculating a second probabilities vector using a second machine learning model. The second machine learning model uses at least the constraint vector as input. The method also includes generating second action outputs by applying a second sampling system to the second probabilities vector. The second action outputs include a second subset of second user actions of a second user operating the second vehicle. The second subset includes only second allowed user actions of the second user.

Other aspects of the one or more embodiments will be apparent from the following description and the appended claims.

BRIEF DESCRIPTION OF DRAWINGS

FIG. 10 shows an example of a constraint-based inference and learning algorithm, in accordance with one or more embodiments.

DETAILED DESCRIPTION

Figure 1:
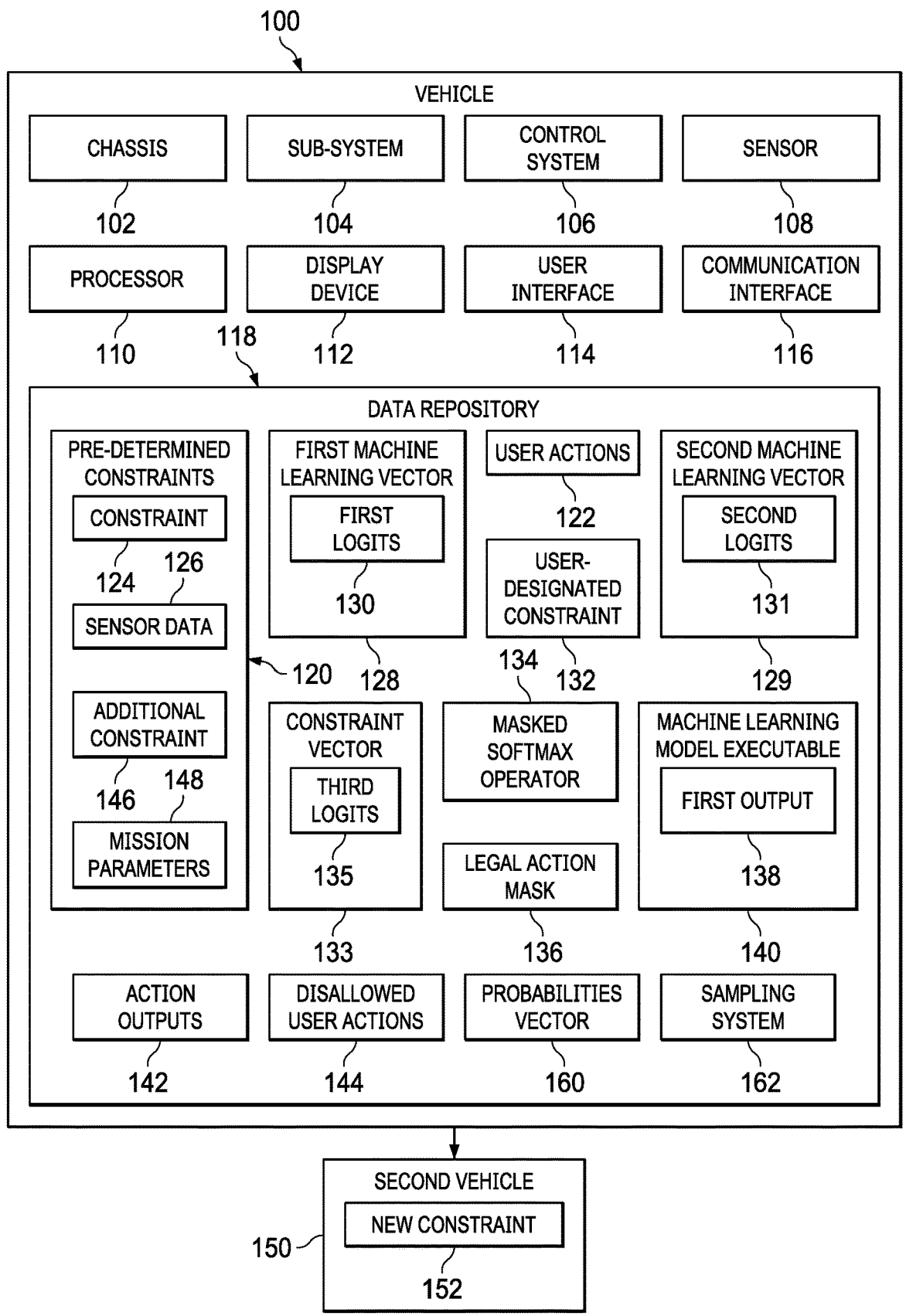
FIG. 1 shows a vehicle having a machine learning model used to modify control of the vehicle, in accordance with one or more embodiments.

Specific embodiments of the one or more embodiments will now be described in detail with reference to the accompanying figures. Like elements in the various figures are denoted by like reference numerals for consistency.

In the following detailed description of embodiments of the one or more embodiments, numerous specific details are set forth in order to provide a more thorough understanding of the one or more embodiments. However, it will be apparent to one of ordinary skill in the art that the one or more embodiments may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

The term "about," when used with respect to a physical property that may be measured, refers to an engineering tolerance anticipated or determined by an engineer or manufacturing technician of ordinary skill in the art. The exact quantified degree of an engineering tolerance depends on the product being produced and the technical property being measured. For a non-limiting example, two angles may be "about congruent" if the values of the two angles are within ten percent of each other. However, if an engineer determines that the engineering tolerance for a particular product should be tighter, then "about congruent" could be two angles having values that are within one percent of each other. Likewise, engineering tolerances could be loosened in other embodiments, such that "about congruent" angles have values within twenty percent of each other. In any case, the ordinary artisan is capable of assessing what is an acceptable engineering tolerance for a particular product, and thus is capable of assessing how to determine the variance of measurement contemplated by the term "about."

As used herein, the term "connected to" contemplates at least two meanings. In a first meaning, unless otherwise stated, "connected to" means that component A was, at least at some point, separate from component B, but then was later joined to component B in either a fixed or removably attached arrangement. In a second meaning, unless otherwise stated, "connected to" means that component A could have been integrally formed with component B. Thus, for example, assume a bottom of a pan is "connected to" a wall of the pan. The term "connected to" may be interpreted as the bottom and the wall being separate components that are snapped together, welded, or are otherwise fixedly or removably attached to each other. Additionally, the term "connected to" also may be interpreted as the bottom and the wall being contiguously together as a monocoque body formed by, for example, a molding process. In other words, the bottom and the wall, in being "connected to" each other, could be separate components that are brought together and joined, or may be a single piece of material that is bent at an angle so that the bottom panel and the wall panel are identifiable parts of the single piece of material.

In general, one or more embodiments relate to improving the performance of machine learning models. In particular, the one or more embodiments relate to improving the output of a machine learning model in view of user supplied constraints that are merged with one or more pre-determined constraints concurrently with, or just prior to, execution of the machine learning model. Note that, as used herein, either the term "pre-determined constraint" or the term "pre-determined constraints" may refer to one or more constraints.

As used herein, a "pre-determined constraint" is a constraint imposed other than by user designation. Thus, a pre-determined constraint may be from a sensor receiving data in real time, may be a pre-mission constraint, or have been received from an external user other than the user of the machine learning model.

The one or more embodiments constrain the output of the machine learning model by concatenating both the user-designated constraints and the pre-determined constraints and supplying the concatenated vector to the machine learning model. In addition, the constraints (both user-designated and pre-determined) are converted into an action mask that includes zeros and ones. Zeros represent disallowed actions, ones represent potentially allowed actions. The output of the machine learning model and the action mask are fed into a masked softmax operator, which outputs a probabilities vector. Because of the action mask, any disallowed action is set to zero in the probabilities vector, but any potentially allowed action has a probability calculated by the machine learning model. A sampling system selects the most likely machine-learned action to take, which may be displayed to a user or used to constrain operation of equipment, such as a vehicle.

The one or more embodiments have practical applications in human-machine interactions, particularly in highly dynamic situations. An example of a highly dynamic situation is air combat. In such dynamic situations, a human user will not have time to infer problems with a machine learning output that makes no sense in a real life combat operation.

For example, a machine learning algorithm could output that the first target to be neutralized should be a particular aircraft in an squadron of enemy aircraft. However, the pilot might have received recent orders that specify, for whatever reason, that engaging that particular aircraft would violate changed terms of engagement. As a result, the pilot must ignore the output of the machine learning model, and the machine learning model has effectively provided no help to the pilot. Worse, the pilot has wasted seconds of time ruling out an output that is not helpful, and further the pilot may no longer trust the machine learning model output in the future.

Thus, disallowed actions should not be displayed or used to control physical systems in such highly dynamic situations. As combat is, by definition, a highly fluid and dynamic environment, being able to handle dynamic changes to constraints and conditions is a design requirement for a machine learning model intended to aid a pilot in combat. Thus, a technical issue exists with respect to how to constrain the output of a machine learning model based on newly imposed constraints, and constraints that are often externally imposed and are changing frequently over time.

The one or more embodiments address and solve this particular technical issue in the manner generally described above. Attention is now turned to the Figures, which provide the details of how the one or more embodiments may be implemented.

Attention is now turned to the figures. FIG. 1 shows a vehicle having a machine learning model used to modify control of the vehicle, in accordance with one or more embodiments.

The vehicle (100) is an automated machine capable of some form of independent motion. Examples of vehicles include aircraft, automobiles, boats, motorcycles, drones, etc. The one or more embodiments specifically contemplate the vehicle (100) as an aircraft, such as a fighter jet or an attack helicopter, though the one or more embodiments are not necessarily limited to aircraft.

The vehicle (100) includes a chassis (102). The chassis (102) is the base frame of the vehicle (100). In the case of an aircraft, the chassis (102) is a fuselage.

The vehicle (100) also includes a sub-system (104) connected to the chassis (102). The sub-system (104) is some operational component of the vehicle (100). For example, the sub-system (104) may be a computer, a rudder, a flap, an electrical circuit, a weapon, a weapon control, a fuel system, a braking system, a propulsion system, etc. In some embodiments, the sub-system (104) may include multiple sub-systems (i.e., the term "sub-system" contemplates both the singular and the plural).

The vehicle (100) also includes a control system (106) connected to the sub-system (104). The control system (106) is one or more parts, a computer system, software an electrical system, a hydraulic system, or some other system that is effective to control operation of the sub-system (104). For example, in the context of a breaking system, the control system (106) may be a hydraulic system that is used to break the aircraft during landing. However, the control system (106) may also include software that instructs a computer when to transmit a signal to an electrical system that controls the hydraulic system. In any case, the control system (106) may be used to control operation of the sub-system (104). Thus, for example, the control system (106) may be used to disable the sub-system (104) or otherwise affect or effect the control of the sub-system (104).

The vehicle (100) also includes a sensor (108) connected to the chassis (102). The sensor (108) is configured to sense a physical parameter associated with the sub-system (104). For example, the sensor (108) may measure the amount of ammunition in a weapon system. In another example, the sensor (108) may measure an amount of remaining fuel. In another example, the sensor (108) may measure a temperature of the sub-system (104). Many other examples are possible, and the use of the term "sensor (108)" includes both the singular and the plural meanings.

The vehicle (100) also includes a processor (110) connected to the chassis (102). The vehicle (100) is a computer processor, such as the computer processor(s) (1802) described with respect to FIG. 18A.

The vehicle (100) also includes a display device (112) connected to the processor (110). The display device (112) is a monitor, screen, television, etc. which is configured to display a graphical user interface and other information according to the instructions provided by the processor (110).

The vehicle (100) also includes a user interface (114) connected to the processor (110). The user interface (114) may take the form of either hardware or software. For example, the user interface (114) may be software that takes the form of a display presented on a touch screen that allows the user to interact with the software. The user interface (114) may be hardware, such as a keyboard, a mouse, a trackball, etc. that allows the user to interact with the software.

The vehicle (100) also includes a communication interface (116) connected to the processor (110). The communication interface (116) allows the processor (110) to communicate with other processors or electronic devices. The communication interface (116) may be configured for a wired or a wireless communications, or both. The communication interface (116) may be the communication interface (1808) described with respect to FIG. 18A.

The vehicle (100) also includes a data repository (118) connected to the processor (110). The data repository (118) stores program code which, when executed by the processor (110), performs a computer-implemented method. In one or more embodiments, the data repository (118) is a storage unit and/or device (e.g., a file system, database, collection of tables, or any other storage mechanism) for storing data. Further, the data repository (118) may include multiple different storage units and/or devices. The multiple different storage units and/or devices may or may not be of the same type and may or may not be located at the same physical site within the vehicle (100).

The data repository (118) stores a variety of different types of data. For example, the data repository (118) stores a number of pre-determined constraints (120), such as the constraint (124). As used herein, a constraint (124) is a data structure that constrains what outputs are acceptable from the machine learning model executable (140), described further below. As used herein, the term "data structure" may refer to any data type that is capable of storing data, such as a primitive data type, a non-primitive data type, a class, a structure, an array, and the like.

As used herein, the user actions (122) are actions that the user may take with respect to the vehicle (100). Thus, the user actions (122) may be to fire a weapon mounted on the vehicle, turn the vehicle (100), accelerate or decelerate the vehicle, or engage or use the sub-system (104).

The pre-determined constraints (120), in particular, relate to constraints that are not the user-designated constraints (132) described below. The pre-determined constraints (120) may be pre-designated mission parameters for the user (e.g., commands from a military superior, mission parameters, rules of engagement), sensor-based constraints (e.g., a vehicle only has enough fuel to reach so far before being forced to return to base, a weapon is fired out of ammunition or missing, etc.), and even user-provided constraints that were provided prior to the contemporaneous inclusion of the user-designated constraint (132) with the pre-determined constraints (120) at run time.

Thus, the pre-determined constraints (120) include several different types of constraints. For example, the pre-determined constraints (120) may include sensor data (126). The sensor data (126) is data taken by the sensor (108). The machine learning model executable (140) may be programmed or trained such that certain constraints on the user actions (122) are presumed. For example, if the sensor (108) senses that the vehicle (100) has run out of fuel, the user actions (122) are constrained such that the software will not allow the machine learning model executable (140) to output a recommendation that the user use the propulsion system (a sub-system (104)) to accelerate the vehicle (100). Likewise, if the sensor (108) senses that a weapon is not present, is out of ammunition, does not have a weapons target lock, etc., the machine learning model executable (140) is constrained from outputting a recommendation that the user fire the weapon.

The pre-determined constraints (120) may also contain an additional constraint (146). The additional constraint (146) is a constraint that is received after the initial pre-determined constraints (120) have been provided, but which is not the user-designated constraint (132) received contemporaneously at run-time.

The pre-determined constraints (120) may also include one or more mission parameters (148). As used herein, the mission parameters (148) are parameters that are defined by an operational authority. For example, in a military context, the mission parameters (148) may be a restriction that orders pilots to avoid flying past a designated latitude, or from engaging certain types of targets.

The data repository (118) also stores a first machine learning vector (128). As used herein a "machine learning vector" is a data structure that is configured to be used as input to a machine learning model, such as the machine learning model executable (140). The term "first" (or "second" or "third," etc.) is only a naming convention used to distinguish one machine learning vector from another. More specifically, the first machine learning vector (128) are the pre-determined constraints (120) converted into a machine learning vector.

The data repository (118) similarly stores a second machine learning vector (129). The second machine learning vector (129) is the user-designated constraint (132) converted into a machine learning vector.

The data repository (118) similarly stores constraint vector (133). The constraint vector (133) is a combination of the second machine learning vector (129) and the first machine learning vector (128). In an example, the combination may be a concatenation (i.e., one vector is appended to the other in some manner). In another embodiment, some other combination may be used, such as an addition, multiplication, etc.

Generally, any machine learning vector (including the first machine learning vector (128), the second machine learning vector (129), and the constraint vector (133)) is a one dimensional table composed of features (the name given to each cell in the table) and values (a number which represents a numerical estimation of the corresponding feature). In some cases, the constraint vector (133) is a vector that includes all of the data to be consumed by the machine learning model executable (140).

A machine learning vector may be characterized as being composed of logits. As used herein, a "logit" is a feature and its associated value within the first machine learning vector (128). Thus, the first machine learning vector (128) may be characterized as being formed from the first logits (130). The term "first" is used only to distinguish one set of logits from another. Thus, the first machine learning vector (128) includes first logits (130). Similarly, the second machine learning vector (129) includes second logits (13), and the constraint vector (133) includes third logits (135).

The data repository (118) also stores the user-designated constraint (132), mentioned earlier. The user-designated constraint (132) is a constraint that is provided by the user via the user interface (114) and/or the communication interface (116). The user-designated constraint (132) is provided after the pre-determined constraints (120) have been incorporated, concurrently with run time of the machine learning model executable (140). Thus, the machine learning model executable (140) is not necessarily pre-programmed or pre-trained to incorporate the user-designated constraint (132) when generating an output.

The machine learning model executable (140) is a machine learning algorithm executable by a processor. The machine learning model executable (140) is trained using training data, as described with respect to FIG. 17. Examples of the machine learning model executable (140) include a deep learning neural network or other type of unsupervised machine learning model. In some cases, the machine learning model executable (140) could be a supervised machine learning model.

The machine learning model executable (140) generates a first output (138). The first output (138) is also a vector. The first output (138) represents predictions that certain features (i.e., user actions) in the constraint vector (133) are likely to produce a desired or optimum result.

Figure 2A:
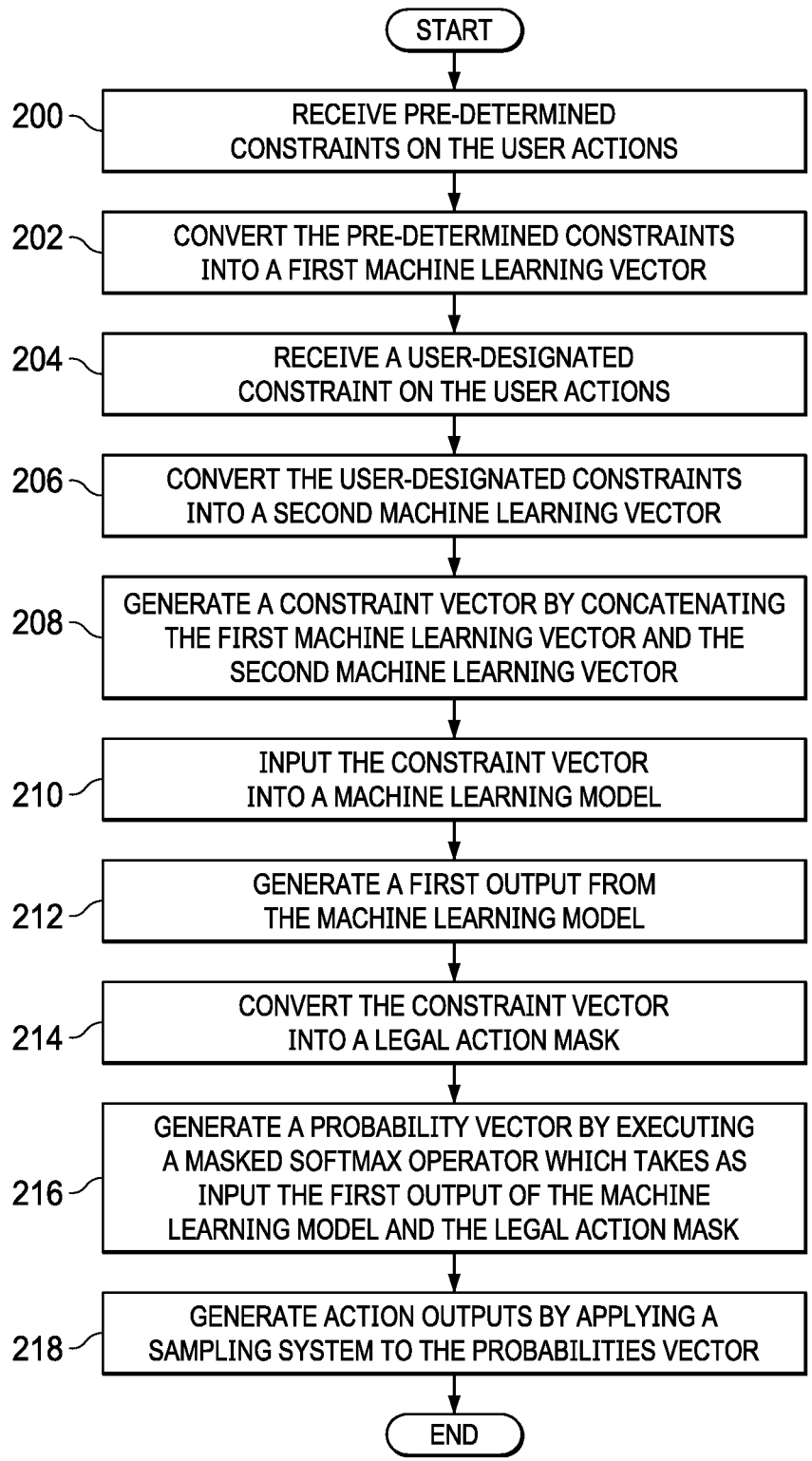
FIG. 2A, FIG. 2B, FIG. 2C, and FIG. 2D show methods of constraining an output of a machine learning model, in accordance with one or more embodiments.
Figure 2B:
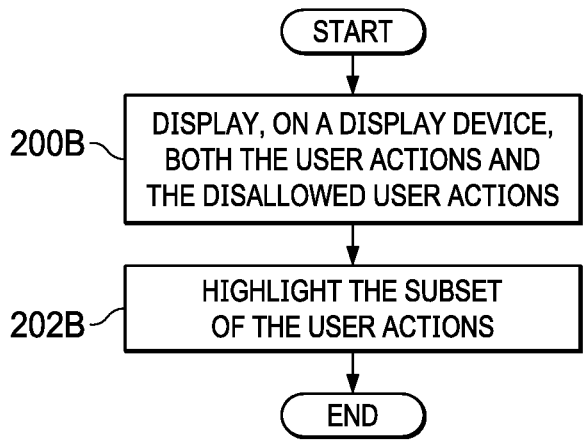
Figure 2C:
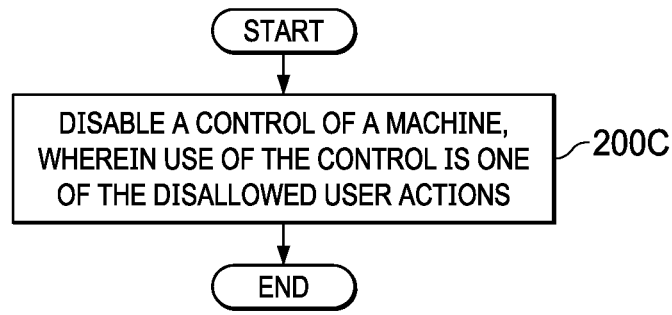
Figure 2D:
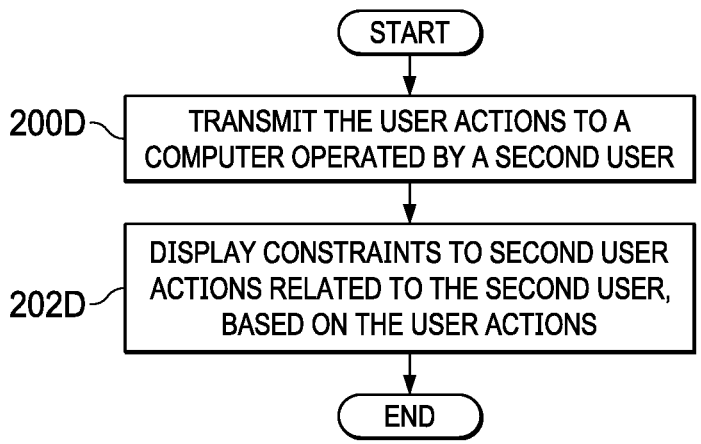

For reasons that are explained with respect to FIG. 2A, the data repository (118) also stores a legal action mask (136). The legal action mask (136) is converted from the constraint vector (133). In particular, the value of each feature that is allowed in the constraint vector (133) is set to the number one. However, the value of each feature that is disallowed in the constraint vector (133) is set to the number zero. Thus, the legal action mask (136) is a vector whose values are all zero or one.

The data repository (118) also stores a masked softmax operator (134). The masked softmax operator (134) is an algorithm that is used to modify the first output (138) of the machine learning model executable (140). In general, the softmax function is a function that turns a vector of K real values into a vector of K real values that sum to one. The masked softmax operator (134) is a type of softmax function. As described further with respect to FIG. 2A, the masked softmax operator (134) takes as input the first output (138) of the machine learning model executable (140) as well as the legal action mask (136).

The data repository (118) also stores a probabilities vector (160). The probabilities vector (160) is the output of the masked softmax operator (134) after operating on the first output (138) of the machine learning model executable (140) and the legal action mask (136).

The data repository (118) also stores a sampling system (162). The sampling system (162) is an algorithm or set of rules and policies that is used to select potential actions from the probabilities vector (160). For example, the potential action with the highest probability might be selected for display to the user, or a set of potential actions with a highest probability might be selected. Other rules and policies, and potentially additional filters may be added as part of the sampling system (162).

The output of the sampling system (162) is one or more action outputs (142). The action outputs (142) are a subset of the user actions (122). In particular, the action outputs (142) are one or more potential user actions that the user could take with respect to the vehicle that have been predicted to be optimal actions and which are deemed legal in view of the constraint vector (133).

The action outputs (142) do not include disallowed user actions (144). The disallowed user actions (144) are one or more actions that a user may not take. The disallowed user actions (144) may be used to constrain operation of the vehicle (100), as described with respect to FIG. 2A through FIG. 3.

Note that the vehicle (100) may communicate via the communication interface (116) with other vehicles or other objects. Thus, for example, the vehicle (100) may communicate with a second vehicle (150). The second vehicle (150) may be another vehicle in a group of vehicles. For example, the vehicle (100) may be a wing commander's vehicle, and the second vehicle (150) may be a wingman's vehicle. Note that, as used herein, the term "wingman" may be synonymous with the term "operator."

The constraint vector (133) and/or the action outputs (142) that apply to the vehicle (100) also may form constrains on the second vehicle (150). Thus, a new constraint (152) is a constraint on the second vehicle (150) that forms as a result of the action outputs (142) and/or the constraint vector (133) constraining the vehicle (100). For example, if the vehicle (100) is constrained from engaging a particular target, the second vehicle (150) may receive a new constraint (152) that also constrains the second vehicle (150) from engaging the same particular target. Alternatively, if the subset of the action outputs (142) allows the vehicle (100) to engage a particular target, and the pilot decides to engage that particular target, then the second vehicle (150) may receive the new constraint (152) to engage some other target. In other words, the fact that the pilot of the vehicle (100) engages a target becomes the new constraint (152) on the second vehicle (150). In this manner, "overkill" is avoided by constraining both vehicles from firing on the same target.

While FIG. 1 shows a configuration of components, other configurations may be used without departing from the scope of the one or more embodiments. For example, various components may be combined to create a single component. As another example, the functionality performed by a single component may be performed by two or more components.

Figure 3:
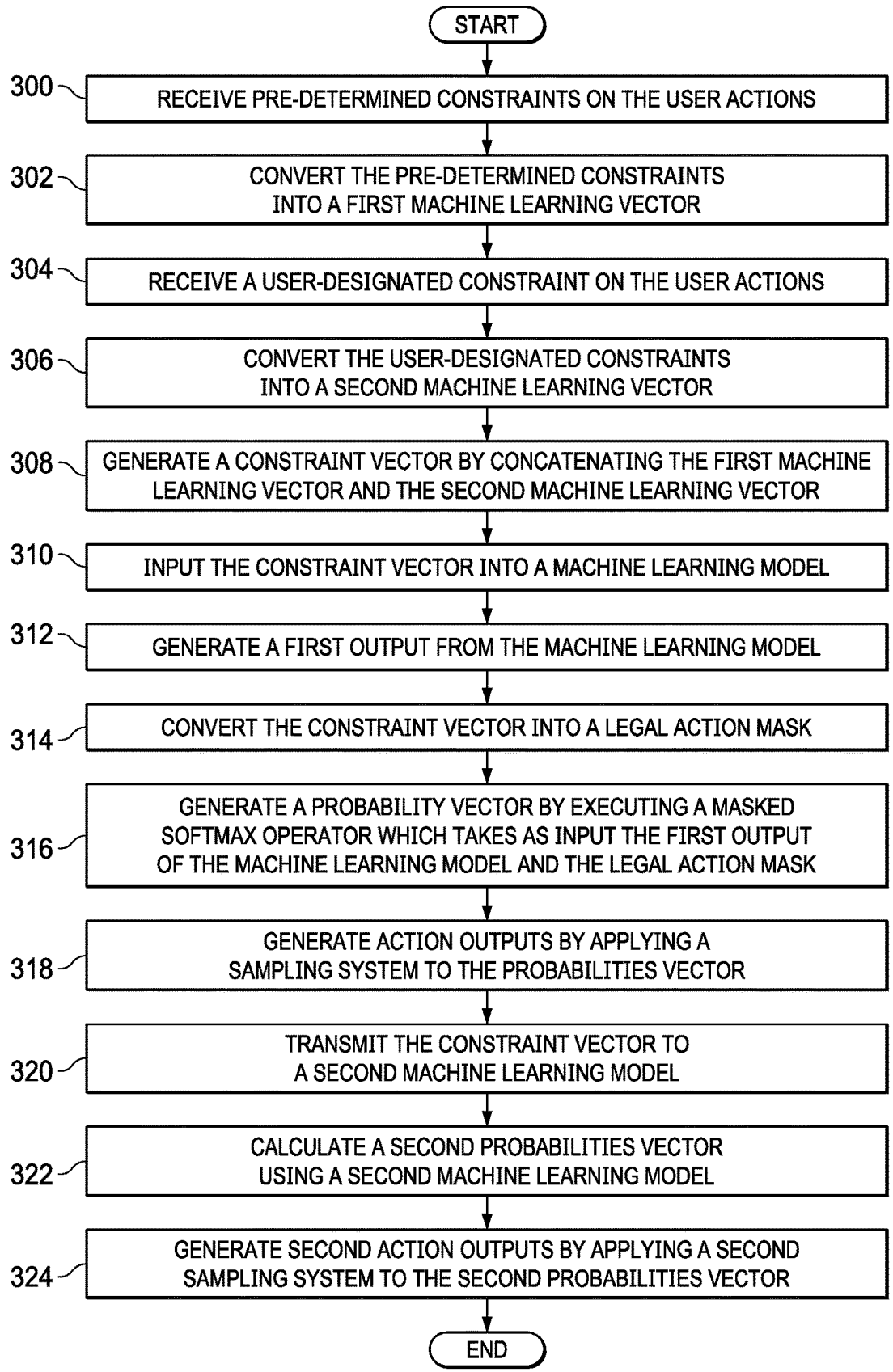
FIG. 3 shows a method of integrating constraint on an output of a machine learning model and operation of a vehicle, in accordance with one or more embodiments.

FIG. 2A, FIG. 2B, FIG. 2C, FIG. 2D, and FIG. 3 are flowcharts, in accordance with one or more embodiments. FIG. 2A through FIG. 2D refer to a method of constraining the output of a machine learning model. FIG. 3 refers to a method of an exemplary use of constraining the output of a machine learning model. The methods of FIG. 2A through FIG. 3 may be executed in a vehicle, such as vehicle (100) of FIG. 1, using a machine learning model, such as the machine learning model executable (140) in FIG. 1.

At step 200, pre-determined constraints on user actions are received. The pre-determined constraints may be received in the form of mission parameters provided prior to a mission, by providing engineering data supplied prior to a mission, by sensor data provided before an action is to be taken, sensor data taken concurrently when an action is to be taken, a communication received concurrently when an action is to be taken, etc. The pre-determined constraints are received in the form of data that either is or may be formatted into a first machine learning vector.

At step 202, the pre-determined constraints are converted into a first machine learning vector including first logits. The conversion may be performed by transforming constraints into features and then assigning values to the features to represent a constraint. For example, a pre-determined constraint may be not to fire a weapon at a target with an identification friend or foe (IFF) signal that indicates a friendly object or vehicle. A value of "0" may be assigned to the feature that indicates a positive IFF-friendly signal. A value of "1" may be assigned to a known enemy target. A value between zero and one may be assigned if an enemy is a lower value target. In this manner, the resulting output of the machine learning model executable will not include a recommendation to fire a weapon at the friendly target.

At step 204, a user-designated constraint to the plurality of user actions is received at a user interface. The user-designated constraint is received from a user. For example, a user may manipulate the user interface to indicate that certain actions are allowed or disallowed. The user may use a touch screen, keyboard, mouse, or some other graphical user interface system to provide the user feedback.

At step 206, the user-designated constraint is converted into a second machine learning vector. The user-designated constraint may be converted into the second machine learning vector in a manner similar to that described for step 202.

At step 208, a constraint vector is generated by concatenating the first machine learning vector and the second machine learning vector. In other words, the first machine learning vector and the second machine learning vector are combined.

At step 210, the constraint vector is input into a machine learning model. For example, the constraint vector may be a one hot vector that is fed to the machine learning model as input.

At step 212, a first output is generated from the machine learning model. The first output may be generated by executing the machine learning model using the constraint vector as the first input to the machine learning model. The machine learning model itself may execute a deep learning algorithm such as a convolutional neural network. The machine learning model may be onboard the vehicle, or may be offboard (i.e., in the "cloud," which is a network of computers).

At step 214, the constraint vector is converted into a legal action mask. The constraint vector may be converted into a legal action mask by setting each value for each feature to either zero or one. A feature value is set to one if the action is allowed. A feature value is set to zero if the action is disallowed or otherwise constrained.

At step 216, a probability vector is generated by executing a masked softmax operator. The masked softmax operator takes, as a second input, the first output (i.e., the output of the machine learning model). The masked softmax operator takes, as a third input, the legal action mask. The masked softmax operator generates, as a second output, the probabilities vector described above. Execution of the masked softmask operator effectively sets to zero any action in the output of the machine learning model that was previously determined to be disallowed or constrained. In this manner, it will not be possible for the overall system to output or suggest any action which has already been determined to be constrained, disallowed, or illegal.

At step 218, action outputs are generated by applying a sampling system to the probabilities vector. The action outputs include a subset of the user actions. The subset of user actions excludes disallowed user actions. The sampling system may operate by applying rules, policies, or some other technique (including possibly yet another machine learning model) for selecting which of the possible actions in the probabilities vector will be selected for display to the user. In a simple example, the highest probability action is selected and thus is (in this case) an action output.

The method of FIG. 2A may be varied. For example, the method of FIG. 2B may be a subset of actions taken as part of step 212 of FIG. 2A.

At step 200B, both the user actions and the disallowed user actions may be displayed on a display device. The display may take the form of a combat situational awareness map, such as those shown in FIG. 12 through FIG. 16. The display may be a map, a heads up display (HUD), etc.

At step 202B, the subset of the user actions may be highlighted. Highlighting may take the form of displaying the allowed user actions more brightly, or by displaying the user actions normally and dimming disallowed user actions. Highlighting may also include displaying a reason for allowing or disallowing a particular user action, perhaps in response to selecting an allowed or disallowed user action. In one embodiment, the method of FIG. 2B may terminate thereafter.

The method of FIG. 2A may be further varied. For example, the method of FIG. 2C may be performed after step 212 of FIG. 2A.

At step 200C, control of a machine is disabled, wherein use of the control is one of the disallowed user actions. Control may be disabled using a control system. For example, the electronics and/or software that govern when a weapon may be fired may be programmed so that when the weapon is constrained from being fired, the pilot may not accidentally fire the weapon. Thus, for example, in the heat of combat, the pilot may be less likely to target a friendly target.

The method of FIG. 2A may be further varied. For example, the method of FIG. 2D may be performed after step 212 of FIG. 2A.

At step 200D, the user actions are transmitted to a computer operated by a second user. The transmission may be performed via wired or wireless communications. For example, the user actions could be transmitted via a radio signal to a computer on a second aircraft operated by the wingman of a wing commander (or operator).

At step 202D, constraints to second user actions related to the second user are displayed based on the user actions. For example, another system, similar to that shown in FIG. 1, may be operational on the computer being operated by the remote user. The computer being operated by the remote user receives the constraints to the second user's actions, as well as potentially the constraint vector of the wing commander or operator, as well as potentially the recommended user action selected for the wing commander or operator. The remote computer then processes and subsequently returns second allowable actions to the second user.

For example, assume that a wing commander selects "target A" as being the target at which a missile will be fired during an air combat. The designation of "target A" becomes a constraint on the remote computer operated on the wingman's aircraft. In this example, it is assumed that it is undesirable to target the same target with multiple missiles. Thus, the computer on the wingman's aircraft will constrain "target A" from being fired upon by the wingman; instead, the wingman will be allowed to target other targets. In this manner, the one or more embodiments provide for a fast and efficient mechanism for command and control of battle groups in dynamic combat environments.

The one or more embodiments of FIG. 2A through FIG. 2D may be varied. For example, at step 208 of FIG. 2A, generating the masked vector for a value network may be performed by applying an element wise multiplication operation to the first plurality of logits and the second plurality of logits. In this case, generating the masked vector for a policy network may be performed by applying a masked softmax operation to the first plurality of logits and the second plurality of logits.

In another embodiment, the pre-determined constraints at step 202 of FIG. 2A may include mission constraints that constrain the user actions based on forbidden actions specified by a second user. Thus, for example, a battlefield commander may transmit one or more constraints to the user's computer for incorporation into the first machine learning vector.

In another embodiment, the pre-determined constraints at step 202 of FIG. 2A may include system constraints that constrain the plurality of user actions based on sensed physical parameters of a vehicle operated at least in part by the user. For example, a sensor may sense a fuel level of an aircraft. In combination with software which calculates how much fuel a set of operations or maneuvers will require, it may be determined whether the aircraft has sufficient fuel to perform certain operations and still reach a base or other target destination. This fact can be used to further constrain user actions.

In particular, the sensed physical parameters may be converted into at least some of the first logits. The sensed physical parameters may be received from sensors operably connected to the vehicle.

In another embodiment, the pre-determined constraints may include an updated constraint received after receiving the plurality of pre-determined constraints. For example, the pilot of the aircraft may indicate that a certain action presented as being allowable is actually is forbidden. The pilot can provide input to designate the action as disallowed, and the computer system will update the vector and then re-execute the machine learning model to present a new set of allowed actions based on the fact that the specified action is disallowed.

In another embodiment, the pre-determined constraints at step 202 of FIG. 2A include mission constraints that constrain the user actions based on forbidden actions specified by a second user. Thus, for example, a wingman's computer may signal that the wingman has already fired a missile, which is no longer available. The machine learning model on the wing commander's computer may take this fact into account and take into consideration that the wingman is constrained from firing that missile again.

In another embodiment, the pre-determined constraints at step 202 of FIG. 2A include system constraints that constrain the user actions based on sensed physical parameters of a vehicle operated at least in part by the user, as described above. The sensed physical parameters are converted into at least some of the first plurality of logits. The sensed physical parameters are received from sensors operably connected to the vehicle. The pre-determined constraints include an updated constraint received after receiving the pre-determined constraints.

Attention is now turned to FIG. 3, which is a variation of the method of FIG. 2A. The method of FIG. 3 may be executed using, in part, the system of FIG. 1. The method of FIG. 3A includes at least two aircraft, a wing commander (or operator) and a subordinate (or wingman).

At step 300, pre-determined constraints on user actions are received. Step 300 is similar to step 200 in FIG. 2A.

At step 302, the pre-determined constraints are converted into a first machine learning vector including first logits. Step 302 is similar to step 202 in FIG. 2A.

At step 304, a user-designated constraint to the plurality of user actions is received at a user interface. Step 304 is similar to step 204 in FIG. 2A.

At step 306, the user-designated constraint is converted into a second machine learning vector. Step 306 is similar to step 206 in FIG. 2A.

At step 308, a constraint vector is generated by concatenating the first machine learning vector and the second machine learning vector. Step 308 is similar to step 208 in FIG. 2A.

At step 310, the constraint vector is input into a machine learning model. Step 310 is similar to step 210 in FIG. 2A.

At step 312, a first output is generated from the machine learning model. Step 312 is similar to step 212 in FIG. 2A.

At step 314, the constraint vector is converted into a legal action mask. Step 314 is similar to step 214 in FIG. 2A.

At step 316, a probability vector is generated by executing a masked softmax operator. Step 316 is similar to step 216 in FIG. 2A.

At step 318, action outputs are generated by applying a sampling system to the probabilities vector. Step 318 is similar to step 218 in FIG. 2A.

At step 320, the first machine learning vector is transmitted to a second vehicle operated by a second user. In other words, the constraints on the wing commander (or operator) are transmitted to the wingman. Transmission of the vector may be performed via wireless communications, and possibly via a wireless network.

At step 322, a second probabilities vector is calculated using a second machine learning model. The second machine learning model is executed for the benefit of the wingman. The second machine learning model may be onboard the aircraft, or may be offboard (i.e., in the "cloud," which is a network of computers). The second machine learning model uses at least the first machine learning vector as input. However, the second machine learning model will also use, as input, second pre-determined constraints that are imposed on the wingman. The second machine learning model may also use, as input, second user-designated that are provided by a pilot, computer, or sensor of the wingman. Thus, the ultimate input to the second machine learning model may be a concatenated or combined vector that includes all of the wing commander (operator) constraints, and those second pre-determined constraints and second user-designated constraints that apply uniquely to the wingman.

Although not shown in FIG. 3, the wingman may also use a similar procedure to that described in FIG. 2A to calculate the second probabilities vector. For example, a second legal action mask and a second masked softmax operator are used, similar to the procedure described with respect to FIG. 2A. Thus, for example, a second output of the second machine learning model may be provided as input to the second masked softmax operator. The second constraint vector of the wingman (i.e., the input to the second machine learning model) is converted into a second legal action mask using a procedure similar to that described above. The second legal action mask is additional input to the second masked softmax operator. The output of the second masked softmax operator is the second probabilities vector.

In any case, at step 324, second action outputs are generated by applying a second sampling system to the second probabilities vector. The second action outputs are a second subset of a plurality of second user actions of a second user operating the second vehicle, and wherein the second subset excludes second disallowed user actions of the second user. In one embodiment, the method of FIG. 3 may terminate thereafter.

The method of FIG. 3 may be varied. However, the method of FIG. 3 may be further varied. For example, the methods of FIG. 2B through FIG. 2D may also be applied with respect to the wingman described in FIG. 3.

While the various steps in the flowcharts of FIG. 2A through FIG. 3 are presented and described sequentially, one of ordinary skill will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments. By way of an example, determination steps may not require a processor to process an instruction unless an interrupt is received to signify that condition exists in accordance with one or more embodiments. As another example, determination steps may be performed by performing a test, such as checking a data value to test whether the value is consistent with the tested condition in accordance with one or more embodiments. Thus, the one or more embodiments are not necessarily limited by the examples provided herein.

Figure 4:
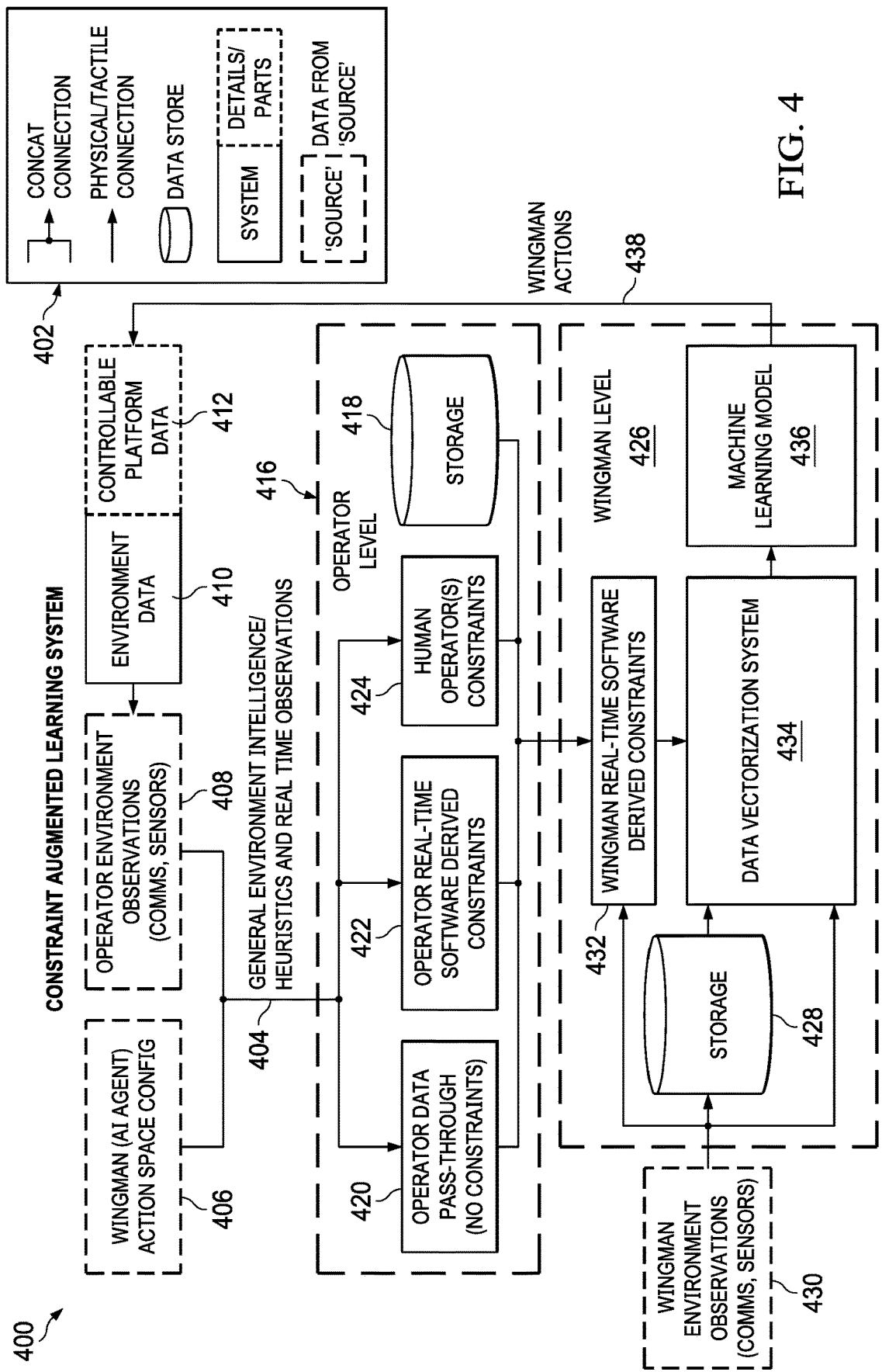
FIG. 4 shows a constraint augmented learning system, in accordance with one or more embodiments.

FIG. 4 through FIG. 15 show examples and additional details of the one or more embodiments described with respect to FIG. 1 through FIG. 3. Turning first to FIG. 4, FIG. 4 shows a constraint augmented learning system, in accordance with one or more embodiments.

FIG. 4 shows a constraint augmented learning system (400) with legend (402). The legend (402) indicates the meanings of the connecting lines and shapes in the system shown in FIG. 4. The system shown in FIG. 4 is a variant of the system shown in FIG. 1, and is particularly useful to implement the method described with respect to FIG. 3.

The constraint augmented learning system (400) is an example implementation in a military air power environment. In the constraint augmented learning system (400) of FIG. 4, it is assumed that there is an "operator" (or wing commander) and a "wingman". The "operator" is the wing commander in a first aircraft, but could be a ground-based commander. The "wingman" may be a pilot in an aircraft that is subordinate to the operator, or the "wingman" may be one or more drones commanded by a human operator or wing commander.

In an embodiment, a number of general environment intelligence, heuristics, and real time observations may be received. The number of general environment intelligence, heuristics, and real time observations are an example of pre-determined constraints (404). The pre-determined constraints (404) may include a wingman action space configuration (406), operator environment observations (408), environment data (410), and controllable platform data (412).

The wingman action space configuration (406) include pre-determined constraints on the activities of the wingman. In particular, the action space configuration (406) may be a series of vectors or a data structure indicating the size/dimensions and possible values of the machine learning systems outputs. The action space configuration may be used to determine the proper shape and organization of subsequently received constraints.

The operator environment observations (408) may include pre-determined constraints based on observations received from various sources, which may include the operator, the wingman, or some other data sources. The operator environment observations (408) includes sensor data, data received via communications, and possibly user-supplied data.

The environment data (410) may include other environment data that applies to the wingman, or to other operational aspects of the combat mission. For example, while the wingman may not know what is happening in some other theater of conflict, such information potentially could be added to the constraints in the environment data (410).

The controllable platform data (412) includes data related to how the aircraft, or parts of the aircraft, may be controlled. Limitations on actions that can be taken by the aircraft may be included in the controllable platform data (412).

Attention is now turned to the operator level (416) of the constraint augmented learning system (400). An operator local storage (418) may store a number of human-derived and software-derived constraints. The operator local storage (418) may thus store operator pass-through data (420), operator software derived constraints (422), and human operator constraints (424).

The operator pass-through data (420) is data that is not necessarily a constraint on the operator, but may be a constraint on the wingman. The operator pass-through data (420) may also include other data which can influence the machine-learning determined constraints of either the operator or the wingman.

The operator software derived constraints (422) are constraints derived from software. For example, a sensor may determine a fuel level of the aircraft. Software can be used to calculate an estimated remaining flight time for the aircraft. In this case, the estimated remaining flight time is an example of a real-time software derived constraint.

The human operator constraints (424) may be received from a user via a graphical user interface or via some other user input device. The human operator constraints (424) indicate constraints provided by the user, possibly as the combat situation develops.

Attention is now turned to the wingman level (426) of the constraint augmented learning system (400). The wingman level (426) includes a wingman local storage (428) for storing data on the wingman's aircraft computer.

The wingman local storage (428) may include wingman environment observations (430). The wingman environment observations (430) may include pre-determined constraints based on observations received from various sources, which may include the operator, the wingman, or some other data sources. The difference between the operator environment observations (408) and the wingman environment observations (430) is that the wingman environment observations (430) more particularly pertains to the wingman's aircraft and mission.

The wingman local storage (428) may also store wingman software derived constraints (432). The wingman software derived constraints (432) are constraints derived from software, as described above with respect to the operator software derived constraints (422), but applicable to the wingman. However, the wingman software derived constraints (432) may also include all of the constraints advanced by the operator. Because the constraints advanced by the operator are processed automatically, such operator constraints may be considered wingman software derived constraints (432).

The wingman software derived constraints (432), as well as other information from the wingman local storage (428), may be provided to a data vectorization system (434). The data vectorization system (434) is configured to convert any available data into a vector, as described above with respect to FIG. 1 and FIG. 2. Thus, the data vectorization system (434) converts all pertinent data into a data structure format suitable for input to a machine learning model (436).

The machine learning model (436) executes locally at the wingman level, by the on-board computer of the wingman's aircraft. Alternatively, the machine learning model (436) could be an off-site computer, in which case the output may be communicated back to the wingman's computer.

The machine learning model (436) outputs a recommended set of actions to take. In particular, the machine learning model (436) outputs a number of actions with associated probabilities. Each corresponding probability represents an estimated likelihood that a corresponding action will result in advancement of the wingman's mission. Thus, a number of potential actions may be presented to the wingman. All actions above a threshold probability could be displayed to the wingman. The actions with within a certain number of the highest number of probabilities could be presented. The probabilities and the associated actions could be presented in a list for selection by the wingman. Many possible alternatives are possible for the output of the machine learning model (436).

In an embodiment, the wingman actions (438) actually selected or performed by the wingman may be returned as feedback (i.e., ongoing updated constraints) back to the constraint augmented learning system (400). In this manner, the operator at the operator level (416) may continually update the system with new information as the wingman takes actions during combat. The operator may provide yet more constraints over time. For this reason, the machine learning model (436) may be re-executed continuously, updating allowed actions or constrained actions for the wingman as the combat environment develops.

Figure 5:
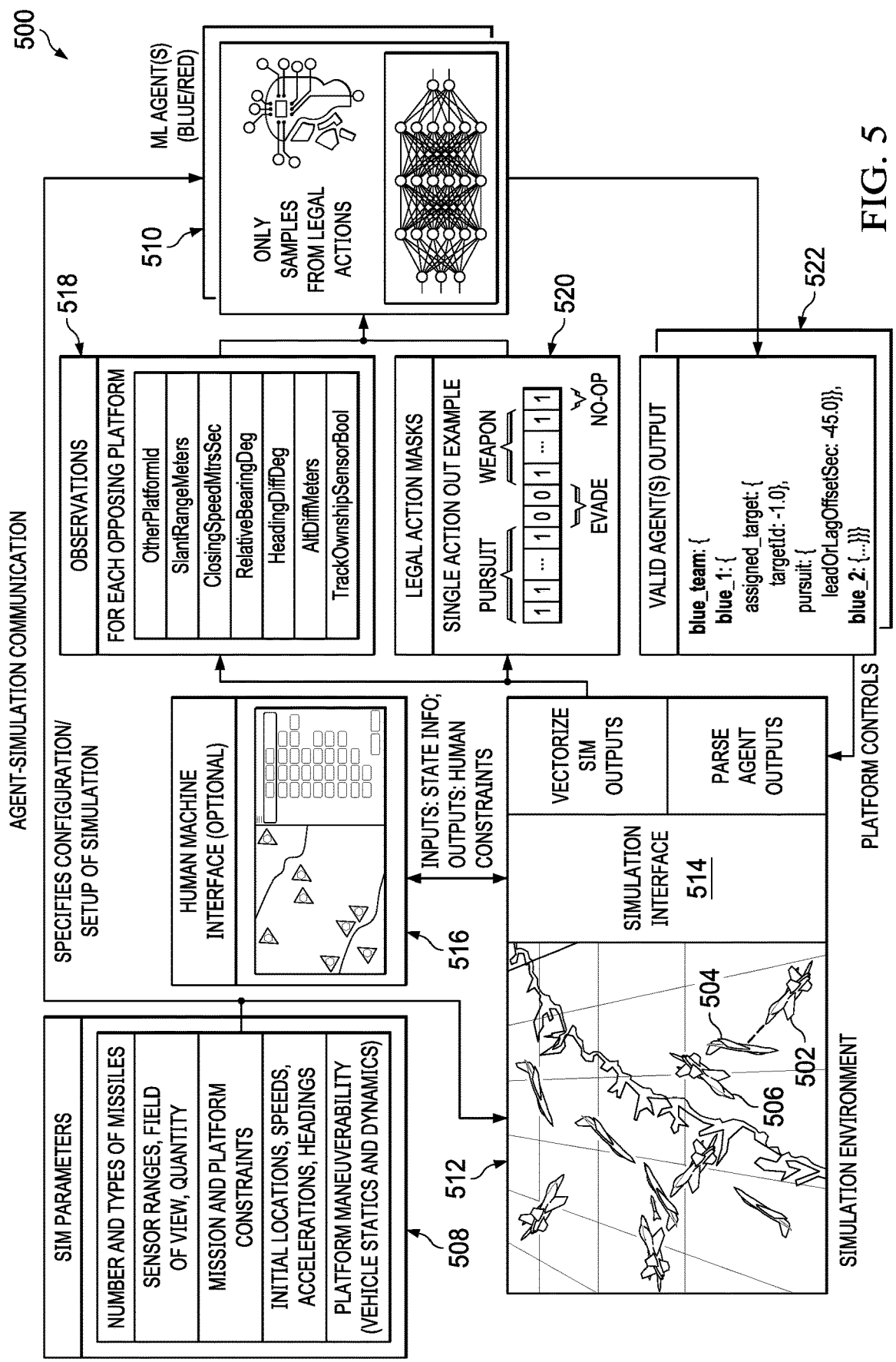
FIG. 5 shows an agent-simulation communication system, in accordance with one or more embodiments.

FIG. 5 shows an agent-simulation communication system, in accordance with one or more embodiments. The agent-simulation communication system (500) shown in FIG. 5 may be used in an air combat simulator to model communications between an operator and wingmen in an air combat environment.

The agent-simulation communication system (500) provides for a centralized agent that provides relational observations from the platforms (aircraft) to every other platform (other aircraft). Thus, for example, the agent-simulation communication system (500) tracks that aircraft "blue 1" (502) is closing speed to aircraft "red 1" (504) and that aircraft "blue 1" (502) is closing speed to aircraft "blue 2" (506), etc. Note that the friendly ("blue") aircraft and the enemy ("red") aircraft are all simulated, so all information about each aircraft is known. Note that the use of colors is for identification purposes only. Thus, color is not shown in the drawings and is not important to understanding the drawings. Note also that in a real combat environment, data is collected in real time from the friendly aircraft and observed for the enemy aircraft.

The agent-simulation communication system (500) is setup using a number of simulation parameters (508). The simulation parameters (508) include the number and type of missiles, the sensor ranges of sensors, field of view of each aircraft, the quantity of aircraft, the mission and platform constraints, the initial locations, speeds, accelerations, and headings of aircraft, and platform maneuverability from vehicle statistics and dynamics. The simulation parameters (508) may include other parameters. The simulation parameters (508) are provided to a ML agent (510).

The term "ML" refers to "machine learning." Thus, the ML agent (510) is a machine learning model, as described above with respect to FIG. 1. The ML agent (510) takes as input, in part, the simulation parameters (508).

The simulation parameters (508) are also provided to a simulation environment (512). The simulation environment (512) is a program which, from the simulation parameters (508), renders a simulation of air combat. The simulation environment (512) thus allows a human technician to simulate an air combat mission.

The outputs of the simulation environment (512) used to render the air combat scenario in the simulation interface (514) may be vectorized. To "vectorize" means that the output of software is converted into a vector data structure suitable for input to the ML agent (510). The output of the simulation environment (512) thus may include observation data (518) stored in the vector.

Optionally, a human-machine interface (516) may be provided. The human-machine interface (516) allows a human to input additional human-imposed constraints on the air combat environment. The human-machine interface (516) outputs state information that transforms the human-imposed constraints into a machine-readable format. Thus, the human-machine interface (516) is provided to the simulation environment (512) to constrain actions that can be taken by the simulated aircraft. The constraints added by the human-machine interface (516) may be incorporated into legal action masks (520) established by the simulation interface (514).

In an embodiment, the observation data (518) is combined with the legal action masks (520). For example, a bit-wise multiplication may be performed between the one-dimensional vector that forms the observation data (518) and the one-dimensional vector that forms the legal action masks (520). The resulting multiplied vector is fed as input to the ML agent (510), along with a vector form of the simulation parameters (508).

Note that only some of the observation data might be combined with the action masks via a bit-wise multiplication. The actions masks could be provided directly as inputs and concatenated with the observation data.

The ML agent (510) outputs a valid agent(s) output (522). The valid agent(s) output (522) represents valid actions that can be taken by each of the agents (i.e. aircraft, ground units, etc.) presented in the simulation environment (512).

In turn, an agent in the simulation environment (512) can parse the valid agent(s) output (522) and use the valid agent(s) output (522) to modify the output of the simulation interface (514). Note that a feedback loop is established in the agent-simulation communication system (500). Thus, as the air combat simulation evolves in real time, the ML agent (510) continually updates allowed actions to the agents in the simulation environment (512).

Figure 6A:
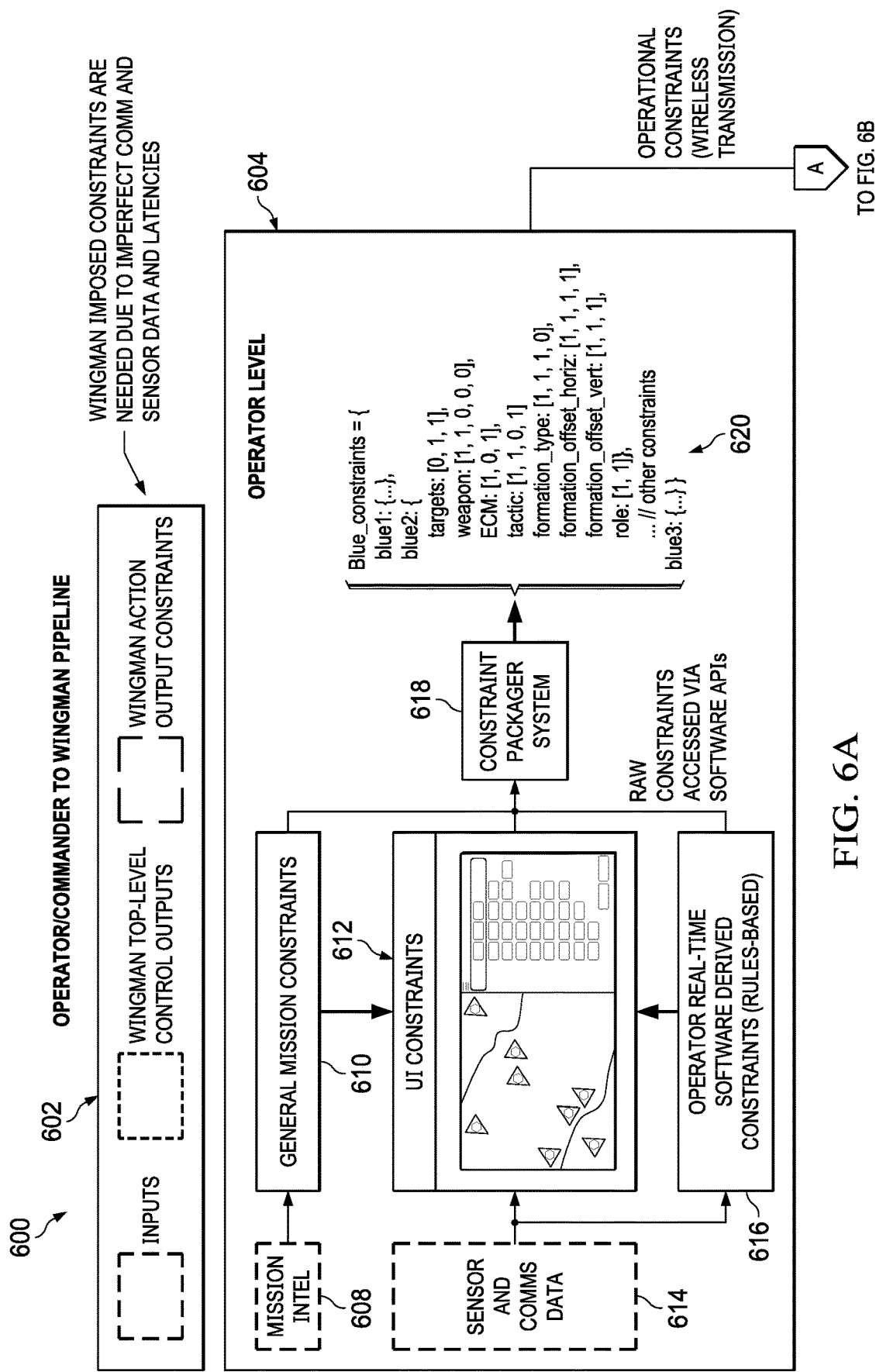
FIG. 6A and FIG. 6B show an operator/commander to wingman pipeline communication system, in accordance with one or more embodiments.
Figure 6B:
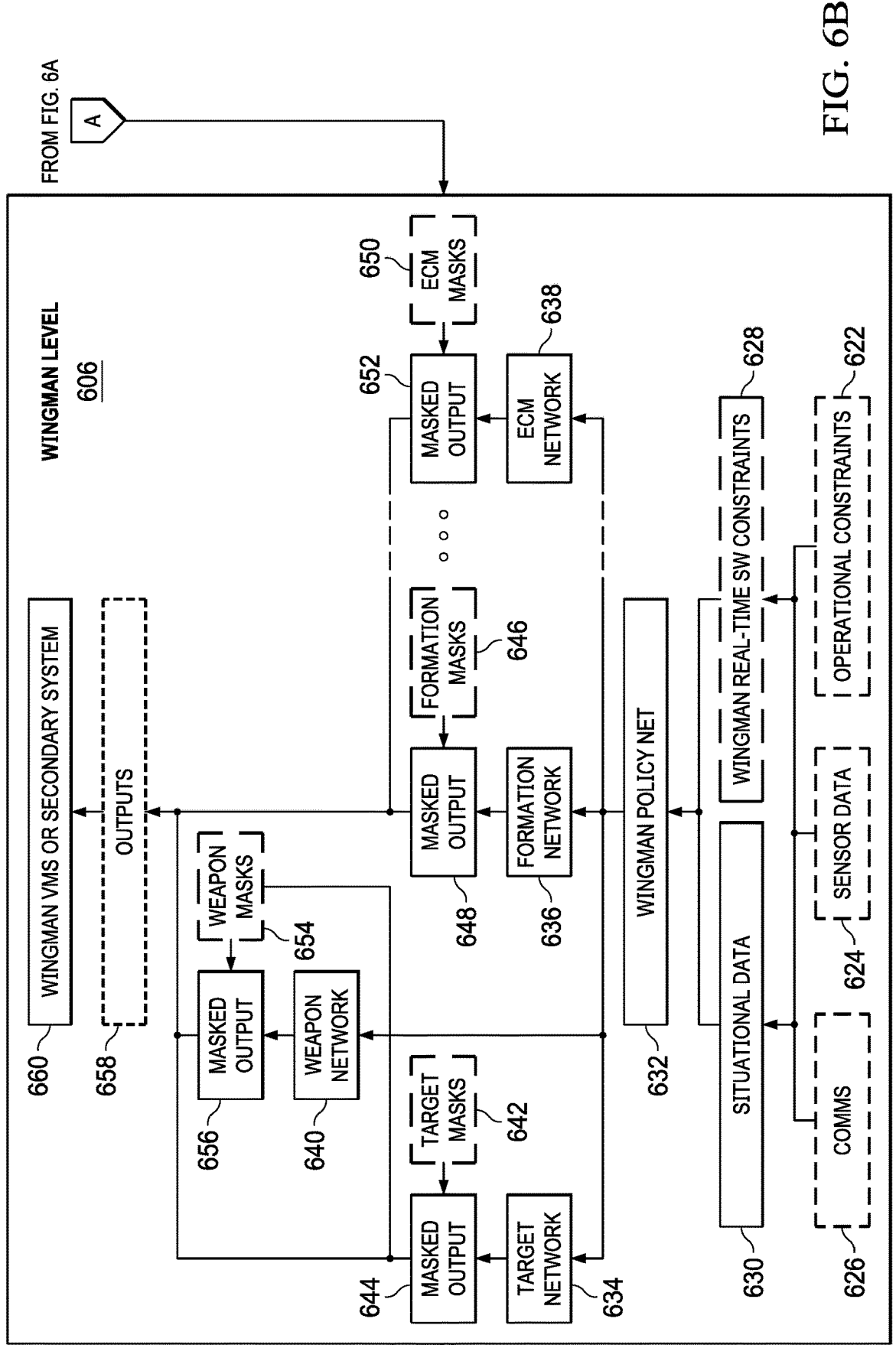

Attention is now turned to FIG. 6A and FIG. 6B, which should be considered together as a whole. FIG. 6A and FIG. 6B show an operator/commander to wingman pipeline (600). The legend (602) indicates the meaning of shading patterns within the blocks shown in FIG. 6A and FIG. 6B. The operator/commander to wingman pipeline (600) is separated into an operator level (604) and a wingman level (606).

At the operator level (604), mission intelligence (608) are added to general mission constraints (610), which in turn are provided to user interface constraints, the UI constraints (612). Sensor and communications data (614) is also added to the UI constraints (612), and may be provided to determine derived, rules-based constraints in the operator real-time software derived constraints (616) program. A constraint packager system (618), which is software transforms all relevant data and constraints into a vector data structure (620). The vector data structure (620) can then be provided to the wingman level (606) of the operator/commander to wingman pipeline (600).

At the wingman level (606) of the operator/commander to wingman pipeline (600), the vector data structure (620) is received as part of operational constraints (622). The wingman's own sensor data (624) and communications data (626) are also gathered. The communications data (626), the sensor data (624), and the operational constraints (622) are integrated as wingman real-time constraints (628). The same data may also be used in determining situational data (630).

A wingman policy net (632) formats data for individual machine learning models, including a target network (634) for constraining targets, a formation network (636) for constraining formation changes, an electronic counter measures network (ECM network (638)) for constraining electronic warfare actions, and a weapon network (640) for constraining weapons use. Thus, for example, a target mask (642) may be applied to the output of the target network (634) to form a first masked output (644). Similarly, a formation mask (646) may be applied to the formation network (636) to form a second masked output (648). Likewise, an ECM mask (650) may be applied to the ECM network (638) to form a third masked output (652). Additionally, a weapon mask (654) may be applied to the output of the weapon network (640) to form a fourth masked output (656).

The outputs from the sub-machine learning models are combined into combined outputs (658). The combined outputs are provided to a wingman vehicle management system or a secondary system (wingman VMS or secondary system (660)). In turn the wingman VMS or secondary system (660) can be used to control the aircraft.

Thus, three systems interact to provide the wingman with operational constraints. The three systems are the mission constraint systems, real time constraints system and user interface system.

The mission constraint system takes in mission intelligence such as analyst or intelligence reports, field reports, special instructions details, rules of engagement, among others. The ingested information is used to construct allowable weapon usage, factors determining weapons usage such as proper identification of targets, electronic counter measures allowable, operational areas, keep out zones, etc. The mission level information can be realized as software via rules based logic. The outcomes of the rules based logic can be converted to a yes/no or zero/one based vectors suitable for use by the machine learning models.

The real time constraint system ingests data from the operators comms, sensors and current platform(s) states. The data is passed through a series of rules based statements that execute at some specified interval. Based on the observed data, certain rules are triggered to allow or disallow particular actions by the wingman. For instance, the logic could be used to deconflict target specification for the wingman. Assume friendlies blue 1, blue 2, and blue 3 and threats red 1, red 2 and red 3. If blue 1 is already targeting red 1, the software system could explicitly forbid blue 2 and blue 3 from selecting red 1. Another example is in disallowing the usage of weapons when ammunition quantities are zero or if the designated target is of the incorrect type. For example, the system could constrain air-air weapons if the target is a surface threat.

The user interface system displays the current constraints being imposed on the selected wingmen from the 'real time constraint system' and 'mission constraint system'. The human operator can likewise specify additional constraints on the actions taken by subordinate wingman. For instance, the human could further specify the wingman's targets, weapons, electronic counter measures employed, tactics, formation and role within a group of collaborating wingmen.

The constraints from the 'mission constraint system', 'real time constraint system' and 'user interface system' are merged together in a nested key value dictionary or some other similar data structure understood by the wingmen. The merged constraints are then passed to the wingman via a wireless connection transmission.

At the wingman level (606), each wingman optionally receives periodic 'operational constraints' from an external commander. Top level operational constraints and the wingman's own sensor and communications data are used to further refine wingman specific constraints. The distinction between operator and wingman derived constraints are useful due to any communications latency. For example, the commander might have outdated information related to the wingman being controlled. The commander might specify certain weapon employment that is no longer available or the coordination of two vehicles that might not exist anymore. For this reason, wingman constraints leverage operator specified constraints as permitted. Situational awareness data and wingman constraints are passed into a learning system, such as a deep reinforcement learning neural network. A shared policy network feeds into several other neural network output heads controlling each of the top level actions available. The outputs from each action head are constrained via their associated constraint vector (masks) at the 'masked output' junction. The final output is sampled from the constrained probability distribution. The masked output junction can be implemented via a combination of a multi-layer perceptron, masked softmax equation and categorical sampling function. Outputs can be autoregressive in nature, meaning that the output of one head can depend on the previous output(s) of another head. As an example, the weapon employed is a function of the target outputs and the weapon network output (logits). Only some of the example outputs are shown for brevity.

All of the outputs are gathered and passed directly to the wingman's vehicle management system (VMS) or a lower level secondary control system which communicates controls to the VMS. A secondary system could take in actions such as the designated targets, weapon chosen, formation type and offsets, and use this, as well as sensor data, to fly the plane toward the target or choose when to fire a missile, among other lower level controls. This secondary system could be implemented via genetic system, fuzzy logic system, rules based system, or deep learning system, among others.

The benefits of an operator providing the networks with constraints is that fine or granular control can be specified via the human machine teaming. In some cases, the human might know the correct action, in other cases a human might only be able to narrow action choices to a subset of choices for the machine learning system to select.

Figure 7:
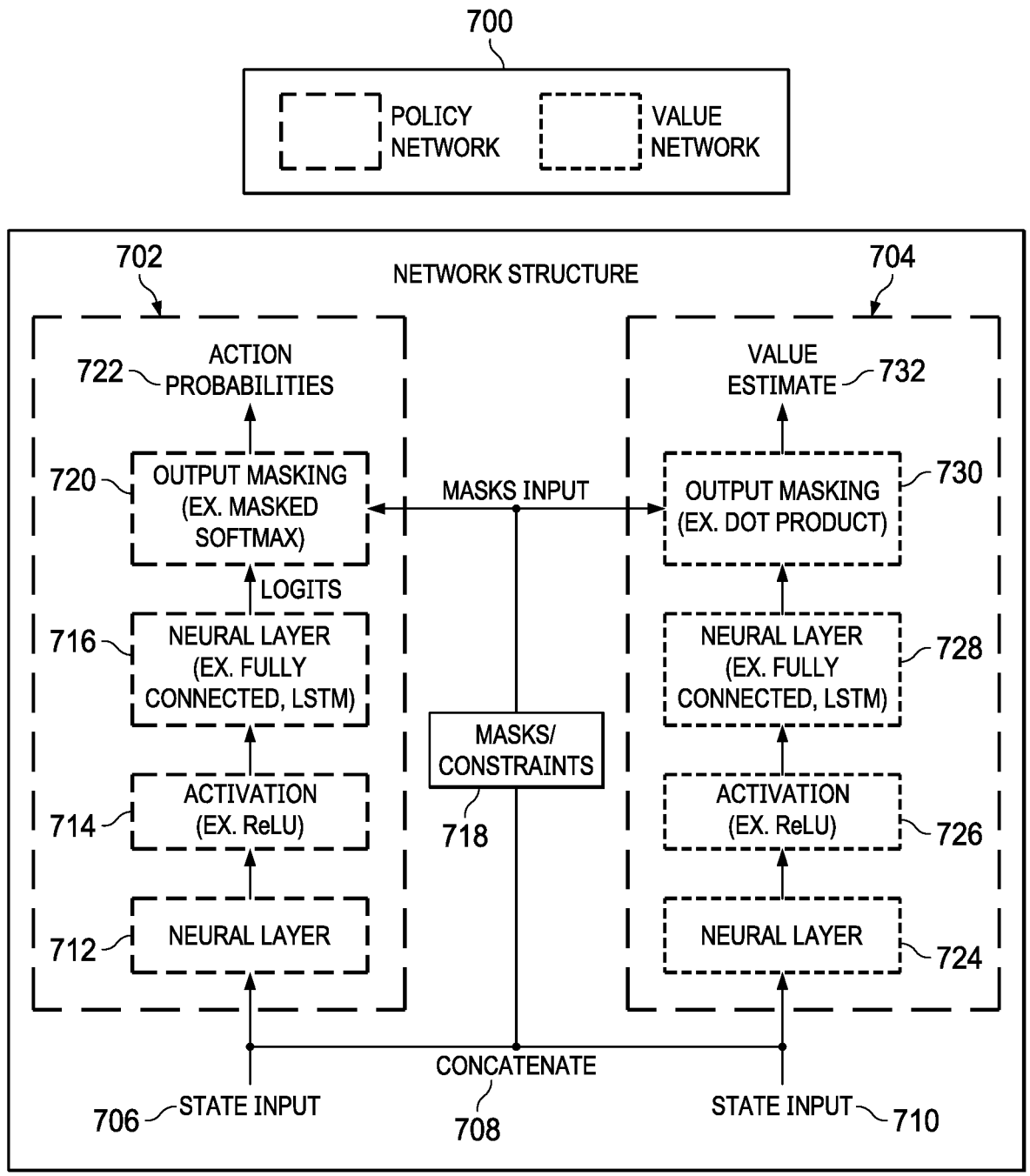
FIG. 7 shows a network system for constraining operation of a machine learning model, in accordance with one or more embodiments.

Attention is now turned to FIG. 7. FIG. 7 shows a network system for constraining operation of a machine learning model, in accordance with one or more embodiments. As used in FIG. 7, the term "network" refers to a neural network, which is a type of a machine learning model. In other words, in FIG. 7, a "network" is not a group of computers communicating with each other. Rather, FIG. 7 describes the structure of the machine learning models described above. The networks receive observations (platform state data) from simulation and action constraints/masks and output discrete actions along with state value estimates.

In particular, as shown by legend (700), two different networks are shown. The two networks are a policy network (702) and a value network (704). For both networks, state input may be combined with masks input. Thus, the policy network (702) may receive state input (706) combined with one or more masks of the masks input (708). Similarly, the value network (704) may receive state input (710) combined with one or more masks of the masks input (708).

For the policy network (702), a neural layer (712) output is provided to an activation function (714) in the form of a rectified linear unit (ReLU). The activation function (714) returns 0 if it receives any negative input, but for any positive value, x, it returns that value back. The output of the activation function (714) is provided to a LSTM neural layer (716), such as a fully connected long short-term memory (LSTM) network capable of learning order dependence in sequence prediction problems. The output of the LSTM neural layer (716) is masked by applying masks/constraints (718) via a masked softmax function. Thus, the output masking (720) is the output of the LSTM neural layer (716) in the form of logits masked by a masked softmax function or operation. The final output is the desired action probabilities (722).

The softmax function is a mathematical function that turns a vector of K real values into a vector of K real values that sums to 1. The output of the output masking (720) is the set of action probabilities (722). The softmax operator may be expressed as $N=\exp(logits_{vec})*action\_masks_{vec}$; $D=\Sigma\exp(logits_{vec})*action\_masks_{vec}$; and $MaskedSoftmax=N/(D+\varepsilon)$, where $\varepsilon \ll 1$.

A similar sequence takes place in the value network (704). However, certain procedures may vary. For the value network (704), a neural layer (724) output is provided to an activation function (726) in the form of a rectified linear unit (ReLU). The activation function (726) returns 0 if it receives any negative input, but for any positive value, x, it returns that value back. The output of the activation function (726) is provided to a LSTM neural layer (728), such as a fully connected long short-term memory (LSTM) network capable of learning order dependence in sequence prediction problems. The output of the LSTM neural layer (728) is masked by applying masks/constraints (718) via a dot product function. The dot product function is an algebraic operation that takes two equal length sequences of numbers and returns a single number.

Thus, the output masking (730) is the output of the LSTM neural layer (728) in the form of logits masked by bit-wise multiplication of the logits of the masks/constraints (718). The final output is the value estimate (732) that is desired.

Figure 8:
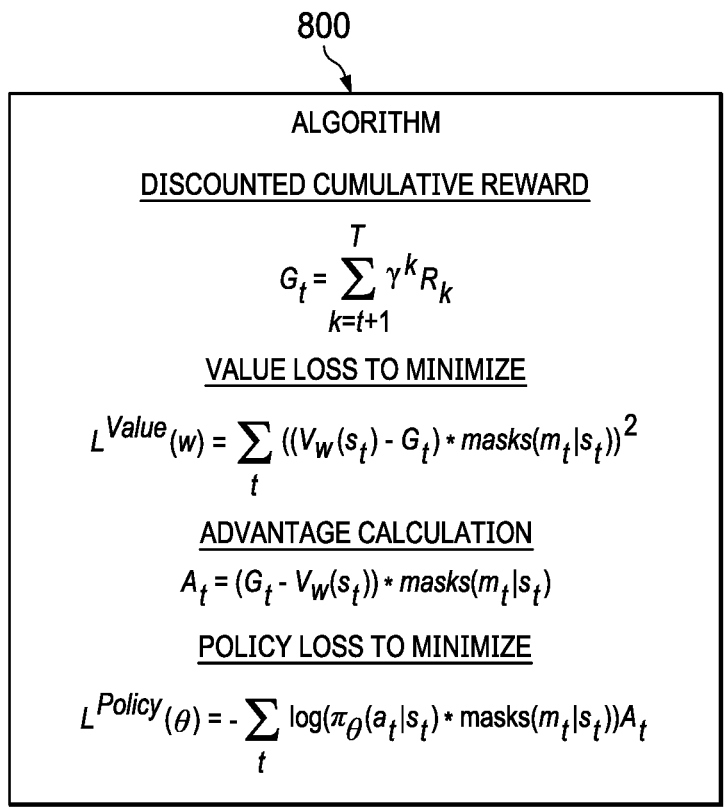
FIG. 8 shows an actor critic algorithm for a machine learning model, in accordance with one or more embodiments.

Attention is now turned to FIG. 8. FIG. 8 shows an actor critic algorithm for a machine learning model, in accordance with one or more embodiments. The algorithm (800) shown in FIG. 8 is based on the actor critic algorithm based on the asynchronous actor critic (A3C). The algorithm (800) shows a discounted cumulative reward equation, a value loss equation to be minimized, an advantage calculation, and a policy loss equation to be minimized.

The equations specify a vector with values for each operational time step within the simulated or real world environment. The algorithm (800) is zero where the masks are zero, indicating an action or state that is not considered or illegal.

The discounted cumulative reward is a vector of weighted and summed rewards accrued within current and future timesteps. The value loss equations measures the quality of being in a particular state where a state could indicate the relative geometries and characteristics of platforms as well as environmental conditions. The value loss equation optimizes the value networks predicted reward by minimizing the squared distance between observed rewards, as determined by human derived software heuristics, and predicted rewards by the value network. A single scalar value or multiple scalar values for different actions may be provided by the value network.

The advantage calculation is used to optimize the policy loss equation. The advantage calculation measures the difference between the quality of a taking a particular action and the subsequent state versus being within the original state in which the action was taken. The advantage heuristic indicates quality versus non-quality actions and is subsequently used to scale the log-likelihood of the policy network outputs, as shown in the policy loss equation. Positive advantage values will increase the likelihood of those actions over time, while negative advantage values will reduce the likelihood of such actions.

Figure 9:
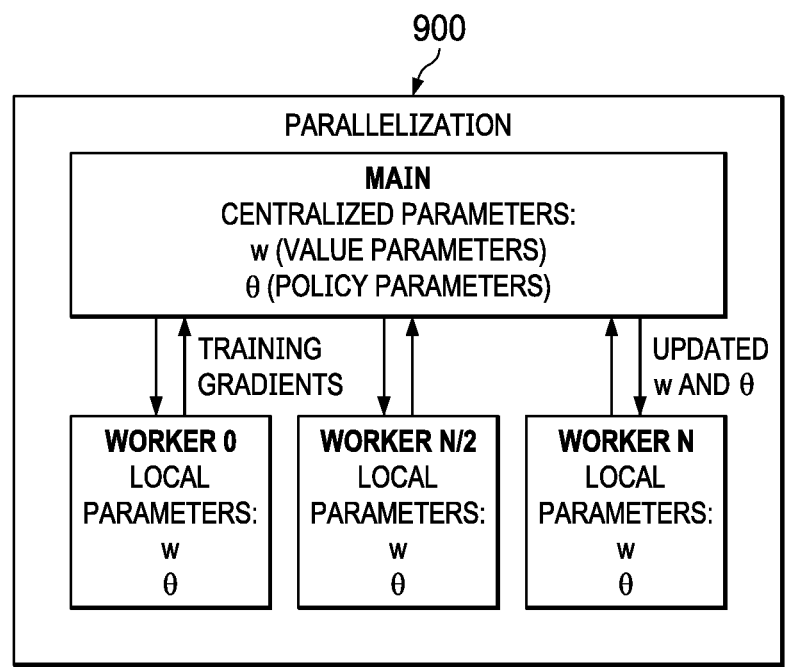
FIG. 9 shows an example of parallelization to execute a machine learning model, in accordance with one or more embodiments.

Attention is now turned to FIG. 9. FIG. 9 shows an example of parallelization (900) to execute a machine learning model, in accordance with one or more embodiments. In summary, each worker runs a different process and communicates with the main process using a multiprocessing module. As used herein, a worker is a logically distinct portion of a processor or processing unit.

The parallelization process expedites the training of machine learning models. Workers execute a copy of the machine learning model implemented in software within a number of simulated environments. Each copy of the machine learning model performs actions and estimates the quality of being in particular states of the simulated environment under different initial conditions. Local copies of the workers send their collected trajectory data (rewards, state, next state, action) or model gradients calculated by applying a training algorithm (800) for each time step of the environment. The trajectory data or model gradients are applied to the machine learning model to update its internal network weighting. The updated machine learning model is copied to the workers. The multiprocessing module may be written in the python programming language.

Attention is now turned to FIG. 10. FIG. 10 shows an example of a constraint-based inference and learning algorithm (1000), in accordance with one or more embodiments. The constraint-based inference and learning algorithm (1000) follows the pipeline shown in FIG. 6A and FIG. 6B.

Initially general mission constraints are retrieved at line 1002. The mission constraints may be derived from an analysts or intelligence officers perspective of the upcoming engagement and asset-threat allocation.

The engagement then starts at line 1004. If the 'environment' is simulated, starting resets the current state of the environment and virtual platforms.

Starting with line 1006, the simulation is continuously stepped frame by frame if the engagement is virtual. If not virtual, repeating intuitively makes sense as temporal 'decision points'.

As indicated at line 1008, The operators platform/system is queried for its current observations of the environmental state. Real time constraints on platforms are retrieved according to rules based software logic conditioned on the current operator's observations of the environment. The rules-based constraints can limit platform behaviors according to the preconditions under which an action can be executed. For instance, no weapons should be fired until an enemy platform is appropriately identified as a threat and within a known sensor and weapon engagement zone. In another example, areas of operation can be used to constrain aircraft operation with respect to weapons, altitude or courses of flight, etc. In other words, the one or more embodiments can be used to restrict altitude adjustments based on no-fly zones, designated areas of operation, etc. In still another example, political considerations may be expressed as rules of engagement that limit aircraft operation or the operation of sub-components of one or more aircraft.

Human constraints are retrieved from the user interface or some surrogate software system if trying to run a simulated environment in 'faster than real time'. The constraints from the real time software system, mission constraints and human provided constraints are merged. The merged constraints are transmitted via the operator's system communication channels to the associated wingmen.

Starting at line 1010, the commanded wingmen execute commands. In simulation, the list of platforms is 'looped' over. Wingman 'number one' receives action masks/constraints from operator via TxRx, which refers to a transmitter/receiver communication system. The wingman retrieves local observations from the wingman's own sensors and communication channels. Wingman rules-based logic determines wingman specific masks derived from local observations and the operator-level constraints. The wingman's local conditions are given priority, as the wingman has different situational awareness than the operator due to imperfect information such as lack of communications, intermitted communications, or latency in communications.

The wingman acts based on the wingman's situational awareness (observations) and wingman masks (constraints). The wingman actions are appended to a list. Data from the wingman is stored for later use by the learning system to inform self-improvement.

The engagement is 'stepped'. Stepping is done in the real world as platforms maneuver in their environment via their determined course of actions. In the virtual world, the simulation 'steps' the environment by a 'frame'. A software system returns the rewards (positive or negative) depending on the quality of the actions provided by each wingman per the state of the environment, regardless of whether environment is real or virtual.

The long term storage saves the rewards. Again, the current time step is used to synchronize the data collection. In simulation, the reward can be a precise integer value associated with the current simulation frame. In the real world, a system clock is updated.

Each wingman's reinforcement learning system is 'updated' via back propagation and gradient descent using the captured data. The wingman's own internal assessment network, estimating the 'quality' of its own actions, is updated. The wingman's policy network determining its course of actions is likewise updated according to the gathered 'rewards'. The update equations are given in FIG. 8 and FIG. 9. The step at line 1012 updates two networks for each wingman, a value assessment network and policy (course of action) network, as shown in FIG. 7.

Figure 11:
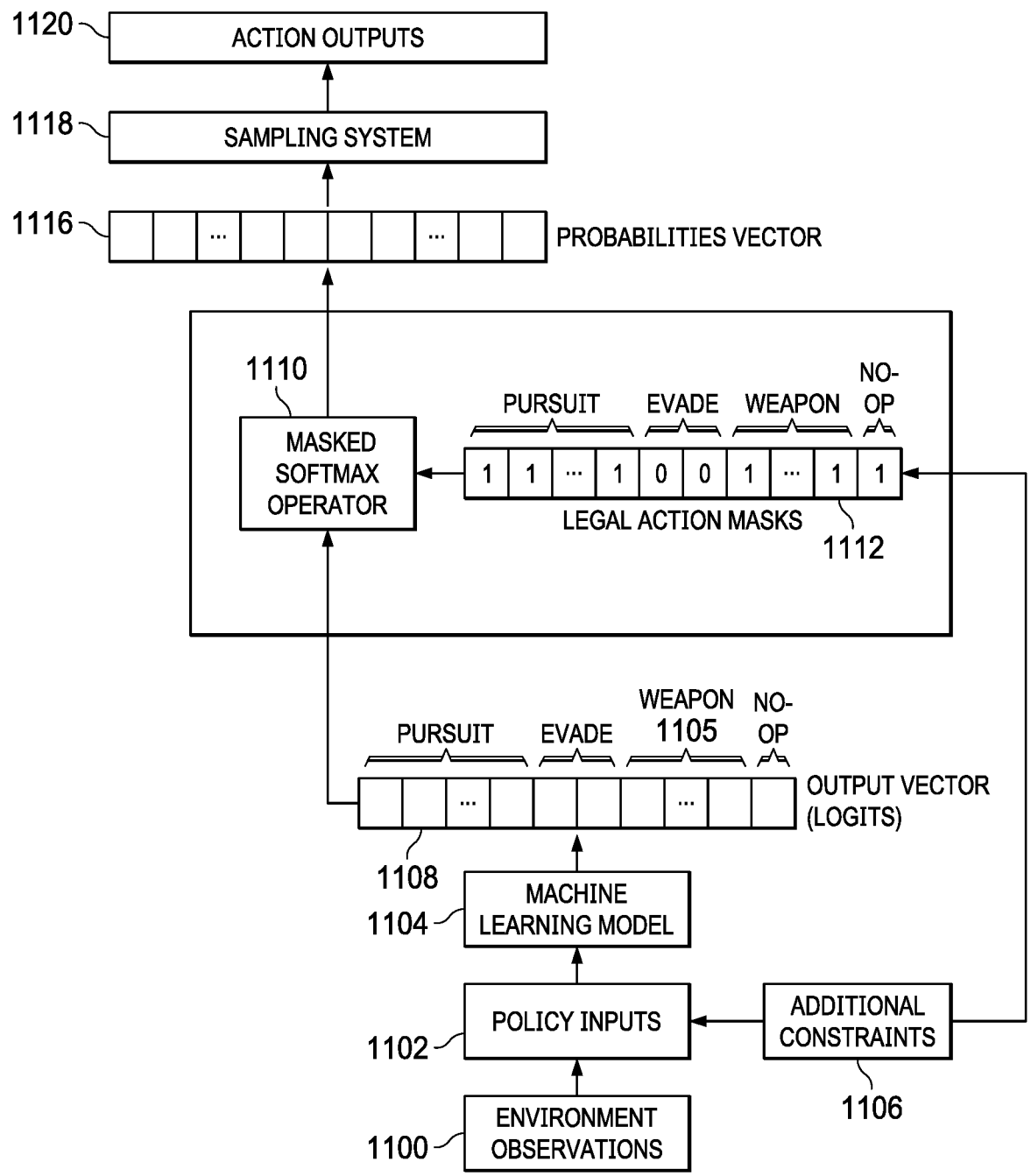
FIG. 11 shows an example of a constraint merging system for a machine learning model, in accordance with one or more embodiments.

Attention is now turned to FIG. 11. FIG. 11 shows an example of a constraint merging system for a machine learning model, in accordance with one or more embodiments. FIG. 11 explains operation of a legal action mask. FIG. 11 is explained with respect to the policy network side of the network architecture shown in FIG. 7, but may also be applied to the value network side shown in FIG. 7. As used in FIG. 11, the term "network" refers to a machine learning model, as defined in FIG. 7, and does not refer to interconnected computers. Thus, the machine learning model (1104) may be characterized as a policy network.

In an embodiment, environmental observations (1100) and policy inputs (1102) are provided to a machine learning model (1104). Again, environmental observations (1100) are sensed data taken by sensors that may be either on an aircraft, based on the ground, space-based, etc., and the policy inputs (1102) are policies such as areas of operation, rules of engagement, etc. Together, the environmental observations (1100) and the policy inputs (1102) are converted into a first machine learning vector.

Optionally, additional constraints (1106), described below, that are pre-determined may be provided by a human operator or by an automated system. The additional constraints (1106) are formatted as a second machine learning vector. The additional constraints (1106) may be received in real time from a human or from a software (SW) system.

In this case, the additional constraints (1106) are combined with the policy inputs (1102) and/or the environmental observations (1100). In other words, the first machine learning vector is combined with the second machine learning vector. The resulting combined vector may be referred-to as a constraint vector. The constraint vector is the input to the machine learning model (1104).

The output of the machine learning model (1104) is an output vector (1108). The output vector (1108) may have different sections, such as section (1105). Each section represents a number of logits (feature values) that describe a particular operational aspect of the aircraft. Sections include pursuit options, evasion options, weapon options, etc.

The output vector (1108) is the set of all possible user action recommendations, with each feature being a potential action and the value of the feature being a probability that the potential action is recommended. Accordingly, groups of user actions in the same subject area are grouped into the sections. Note that the output vector (1108) may contain some actions with non-zero recommendation probabilities, even though those actions are constrained or disallowed.

The additional constraints (1106) are, in addition to forming part of the input to the machine learning model (1104), are converted into a legal action mask (1112). The legal action mask (1112) is the additional constraints (1106); however, each feature value is converted to either a zero or a one. Constrained features (those that are disallowed) are set to zero, and allowed features that have non-zero probabilities (those that are allowed and at least possible) are set to one. Thus, the legal action mask (1112) is a vector comprising features whose values are either "1" or "0".

The output vector (1108) and the legal action mask (1112) are inputs to a masked softmax operator (1110). The masked softmax operator (1110) is as described with respect to FIG. 1. In brief, the masked softmax operator (1110) changes the output vector (1108) so that the feature values sum to one. The output of the masked softmax operator (1110) is a probabilities vector (1116). The probabilities vector (1116) includes those user actions which could be possibly selected for presentation to a user. However, due to the input of the legal action mask (1112), disallowed or constrained user actions in the probabilities vector (1116) will have a probability of zero. Possible user actions in the probabilities vector (1116) may have a non-zero probability.

The probabilities vector (1116) is provided as input into a sampling system (1118). The sampling system (1118) is rules or policies for selecting one or more of the possible user actions in the probabilities vector (1116) that have a non-zero probability. For example, the highest probability user action in each section may be selected for presentation to the user. The sampling system (1118) may be another machine learning model in some embodiments.

The output of the sampling system (1118) is the action outputs (1120). The action outputs (1120) are the selected user actions. The action outputs (1120) may be displayed to a user, may be used to control sub-systems in a vehicle or some other machine, or may be stored or used in other software systems.

FIG. 12, FIG. 13, FIG. 14, FIG. 15, and FIG. 16 show examples of user interfaces modified based on outputs of a machine learning model constrained by the one or more embodiments. In other words, FIG. 12 through FIG. 16 show examples of a user interface evolving over time as the system shown in FIG. 1 constrains, allows, and recommends certain actions during an air combat operation. In FIG. 12 through FIG. 16, the term "UI" refers to "user interface."

The use of colors for names in FIG. 12 through FIG. 16 is merely for identification purposes, as color is unimportant to understanding the figures. FIG. 12 through FIG. 16 use common reference numerals, having common definitions.

Figure 12:
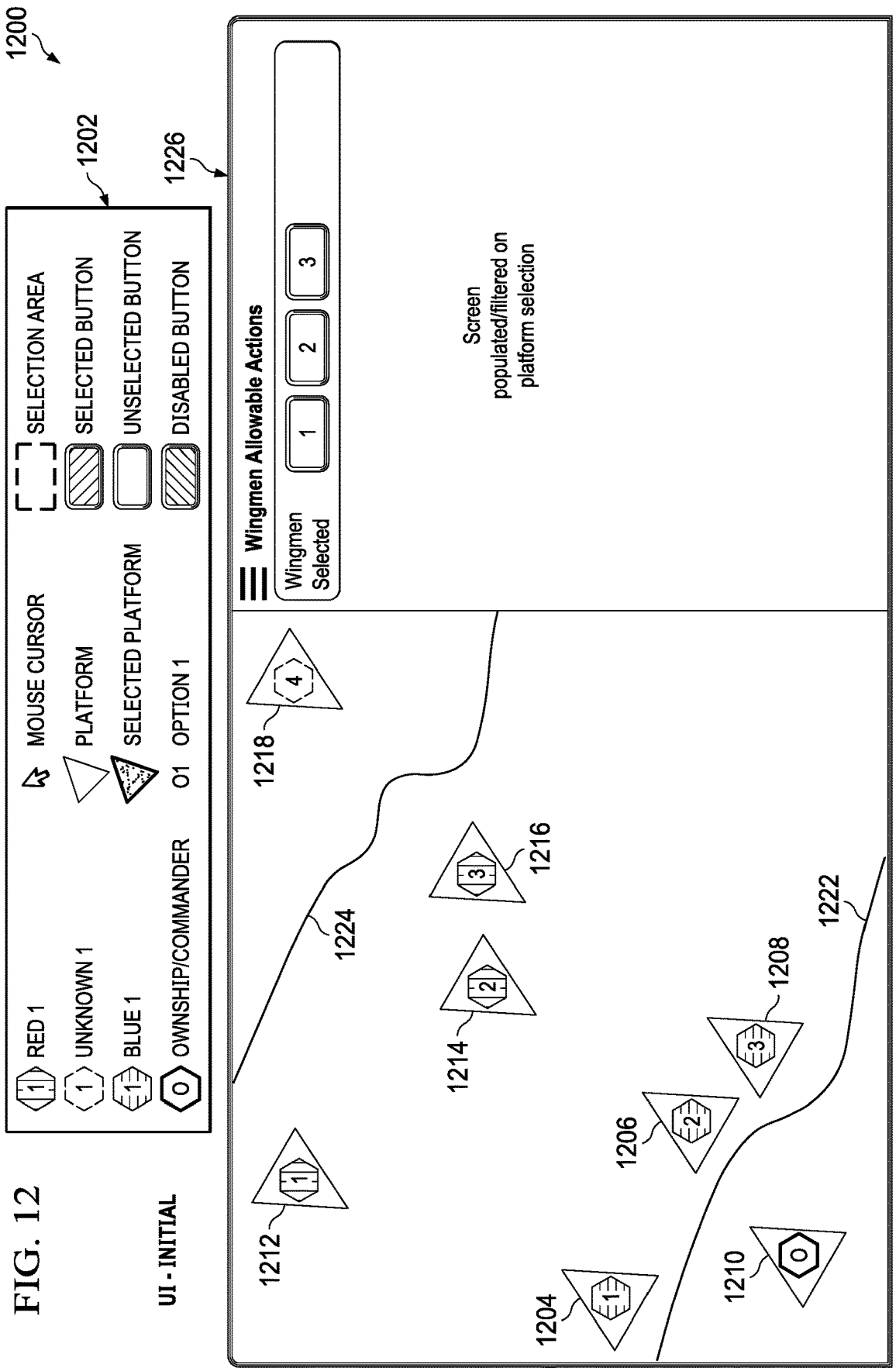
FIG. 12, FIG. 13, FIG. 14, FIG. 15, and FIG. 16 show examples of user interfaces modified based on outputs of a machine learning model constrained by the one or more embodiments.

FIG. 12 shows an initial UI state in UI (1200), as explained by legend (1202). Four friendly aircraft, blue 1 (1204), blue 2 (1206), blue 3 (1208), and blue 0 (1210) are tasked with engaging in air combat four enemy aircraft, including red 1 (1212), red 2 (1214), red 3 (1216), and red 4 (1218). In this example, blue 0 (1210) is wing commander (operator), and the remaining blue units are wingmen. The UI (1200) shown in FIG. 12 is displayed on an on-board computer on the aircraft represented by blue 0 (1210).

Lines may be used as terrain or territory references. For example, line (1222) may represent a friendly operational zone, and line (1224) may represent a political boundary. Initially, in FIG. 12, none of the platforms (i.e., aircraft in this example) have been selected. Thus, initially, no wingman allowable actions are shown in display window (1226).

Figure 13:
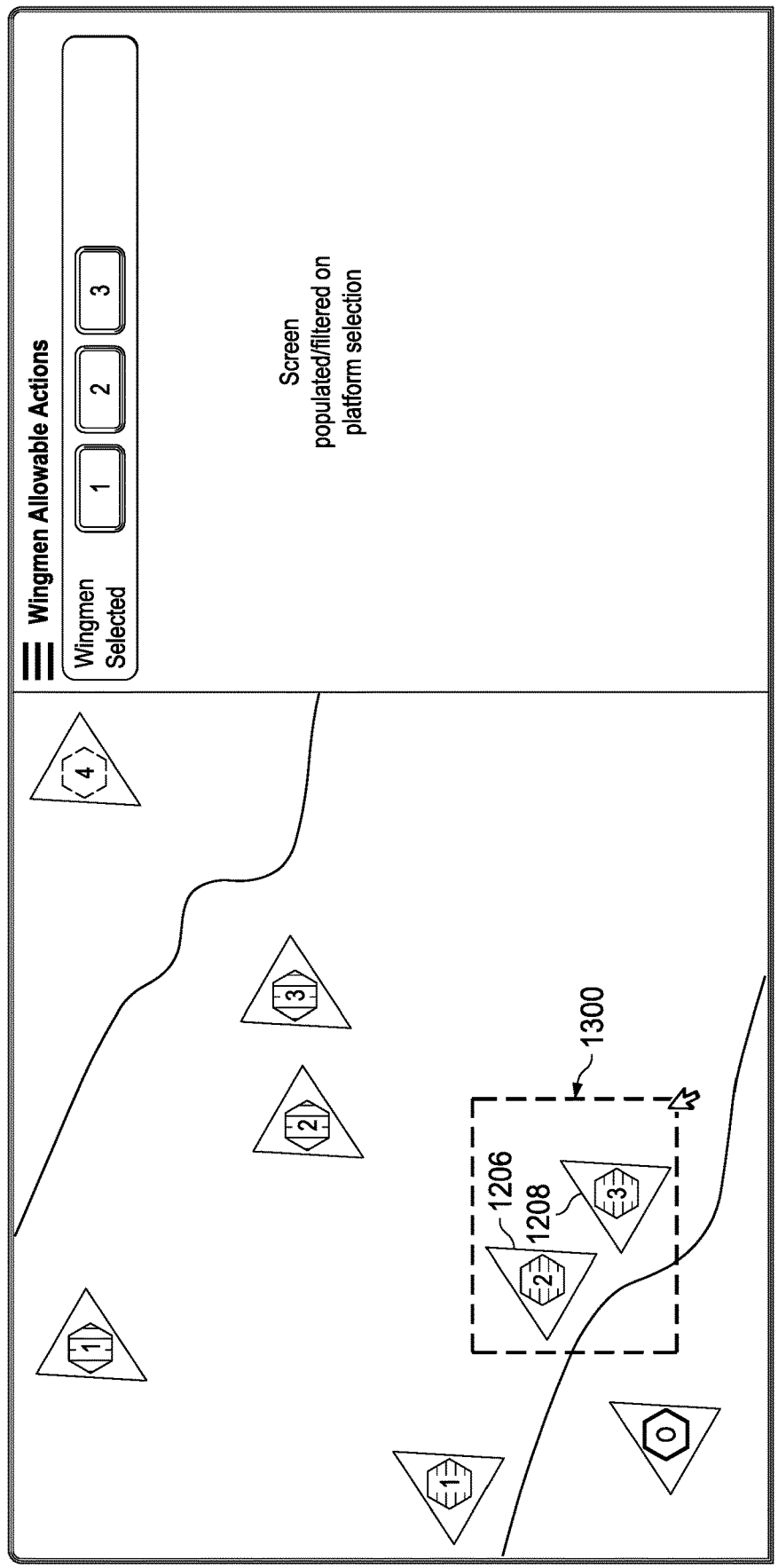

FIG. 13 represents a first step in generating machine-learned recommended actions, as constrained by a human operator, according to the one or more embodiments described with respect to FIG. 1 through FIG. 11. In particular, as shown by the dashed box (1300) being dragged around blue 2 (1206) and blue 3 (1208), the wing commander pilot is designating two wingmen that the wing commander wishes to command.

Figure 14:
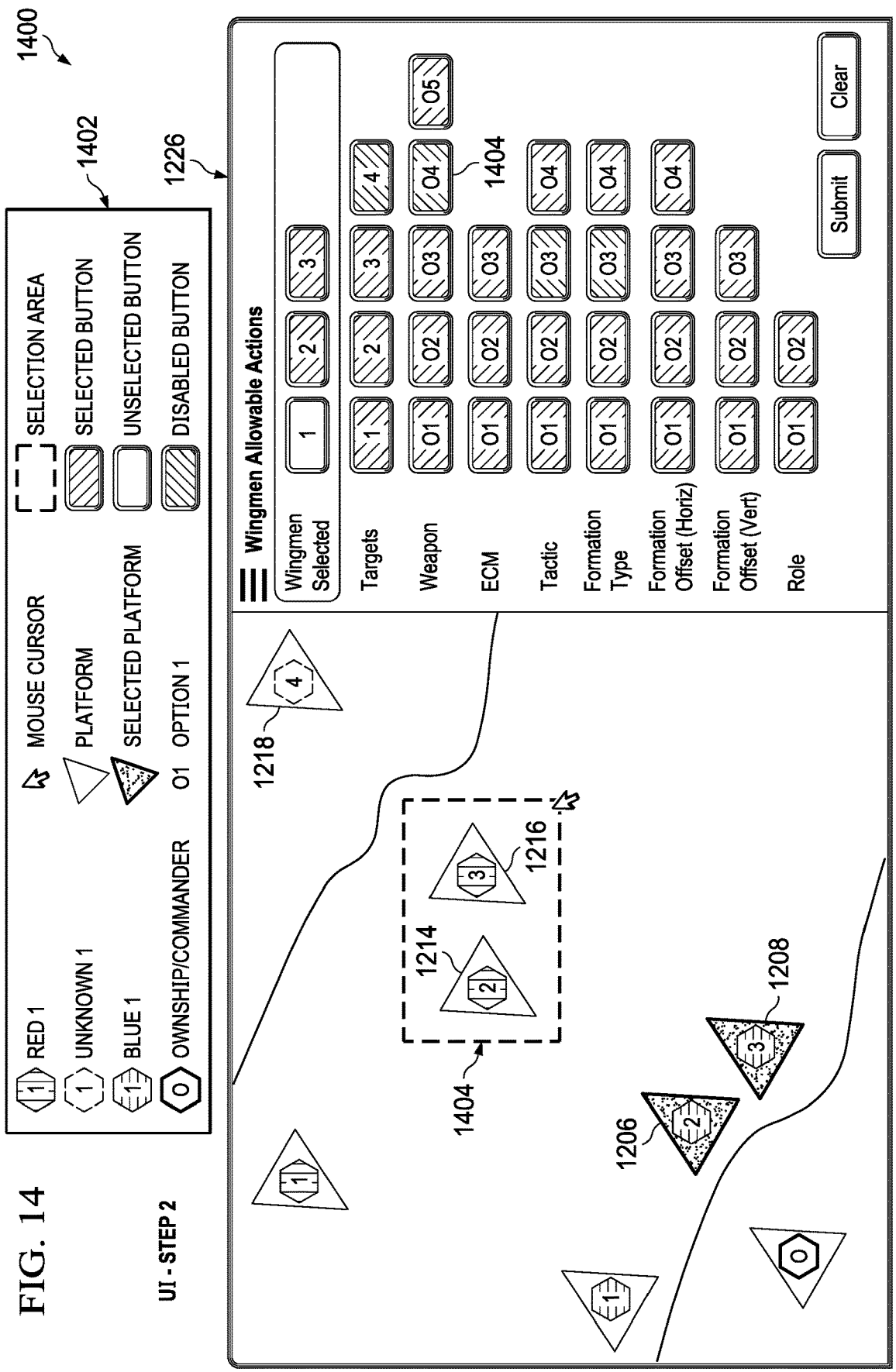

FIG. 14 represents a second step in generating machine-learned recommended actions, as constrained by a human operator, according to the one or more embodiments described with respect to FIG. 1 through FIG. 11. FIG. 14 shows the state of the UI (1400) with legend (1402) after selection of blue 2 (1206) and blue 3 (1208). In particular, as shown by the dashed box (1404) being dragged around red 2 (1214) and red 3 (1216), the wing commander pilot is designating two enemy craft that the wing commander wishes to target or track.

The display window (1226) shows allowed or available wingman options. Examples of allowed actions include target selection, weapons, electronic counter measures, among others. Allowed actions are shown in a shading pattern as indicated in the legend (1402). Disallowed or constrained actions are shown in another shading pattern as indicated in the legend (1402). Allowed actions can be taken with respect to the selected targets; constrained actions cannot be taken with respect to the selected targets.

For instance, target red 4 (1218) is disabled as a valid target selection. The constraint could occur because the designated platform has not been identified as friend or foe, and can thus not be fired upon per example rules of engagement. As another example, weapon 'option 4' (1404) in the display window (1226) is disabled to show that the selected platforms (blue 2 (1206) and blue 3 (1208)) cannot use the weapon in question. The selected aircraft might not carry the designated weapon type, or may have already used available ammunition for the selected weapon type.

In an embodiment, the wing commander can select certain other actions as being constrained or disallowed, for whatever reason the wing commander knows, by selecting some other button in the display window (1226). Note that, in a different embodiment, constrained actions may be overridden by selecting an override button or by selecting a constrained action in the display window (1226). In an embodiment, an attempt to override a constraint may be denied if the requested action is not physically possible, such as when a weapon is not physically available. In an embodiment, a reason for the constraint may be displayed if the pilot attempt to override so that the pilot may reconsider the override attempt.

Figure 15:
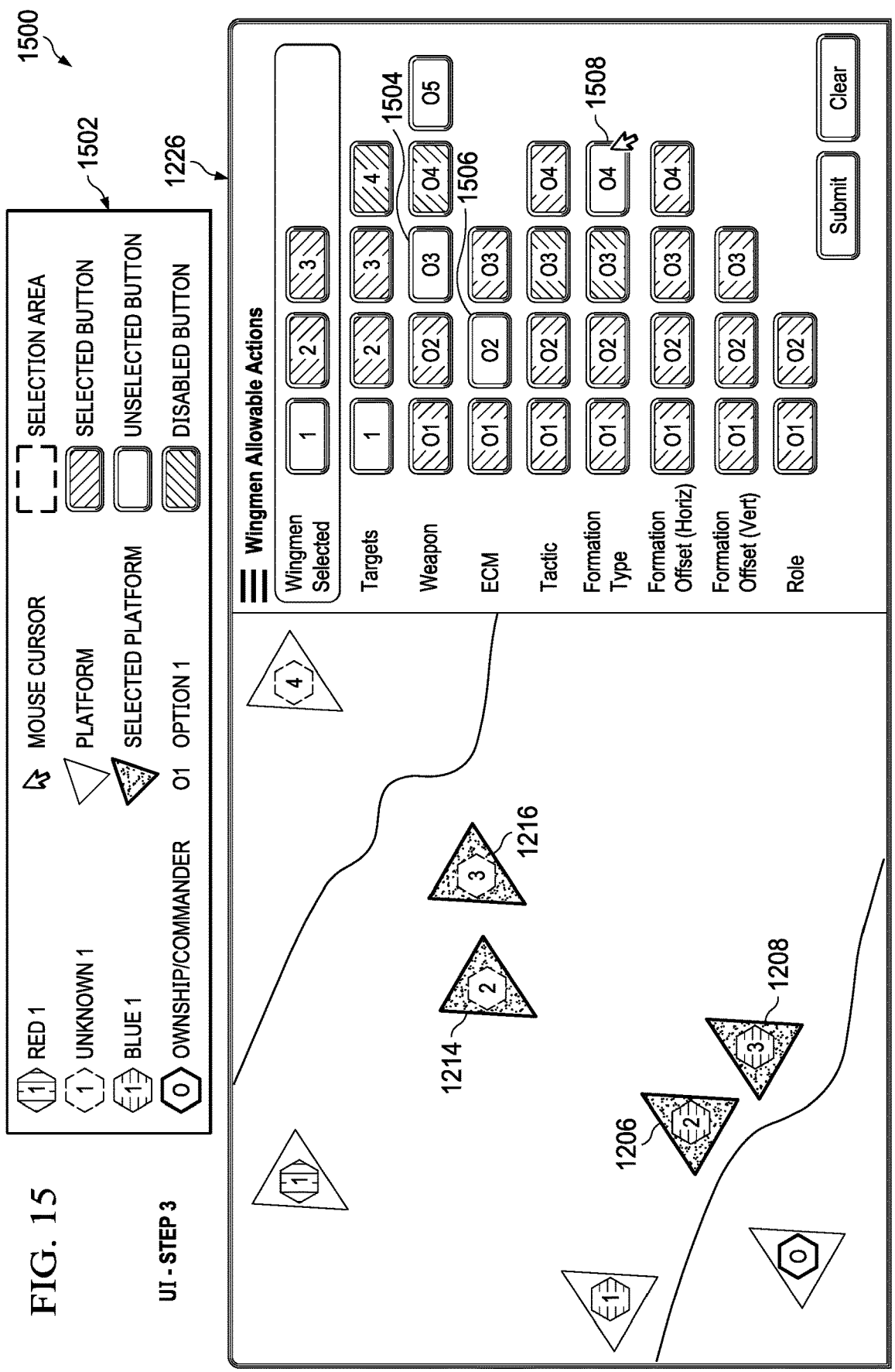

FIG. 15 represents a third step in generating machine-learned recommended actions, as constrained by a human operator, according to the one or more embodiments described with respect to FIG. 1 through FIG. 11. The UI (1500) includes a legend (1502) for identifying different aspects of the UI (1500).

With friendly wingman blue 2 (1206) and blue 3 (1208) selected and possible targets red 2 (1214) and red 3 (1216) selected, the human wing commander can begin to further specify operational constraints on the behaviors of the wingmen. For instance, in FIG. 15, the wing commander decided to disallow weapon option 3 (1504), electronic counter measure option 2 (1506) and formation type option 4 (1508) by selecting those options in the display window (1226). These actions are then applied using a bit mask, as described with respect to FIG. 1 through FIG. 12.

Figure 16:
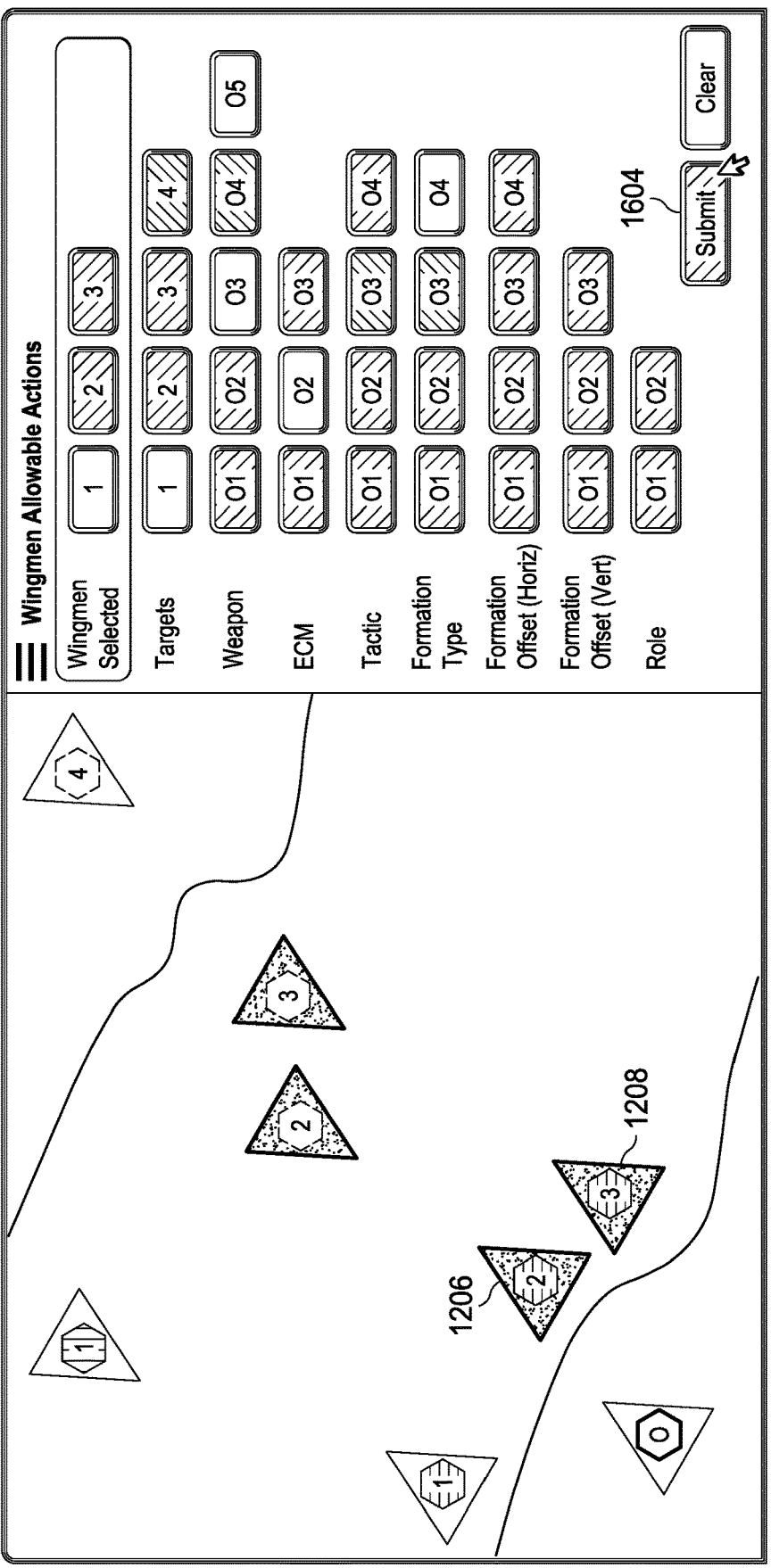

FIG. 16 represents a fourth step in generating machine-learned recommended actions, as constrained by a human operator, according to the one or more embodiments described with respect to FIG. 1 through FIG. 12. The UI (1600) has a legend (1602). The operator has hit the "submit" button (1604). In turn, the constraints are passed to the wingmen, blue 2 (1206) and blue 3 (1208). Thus, when the wingmen view a similar UI being displayed by their own local computers, they will see the actions the wing commander-constrained actions as being displayed as constrained for the wingmen.

Note that the constrained actions may be used to directly control any of the vehicles. For example, a vehicle's systems may be controlled to prevent activation or actuation of a constrained system, without an override. Thus, the one or more embodiments might be used to prevent firing at a target that lies outside of the rules of engagement, or an aircraft may be physically constrained from adopting a particular formation. Thus, the one or more embodiments have several variations.

Figure 17:
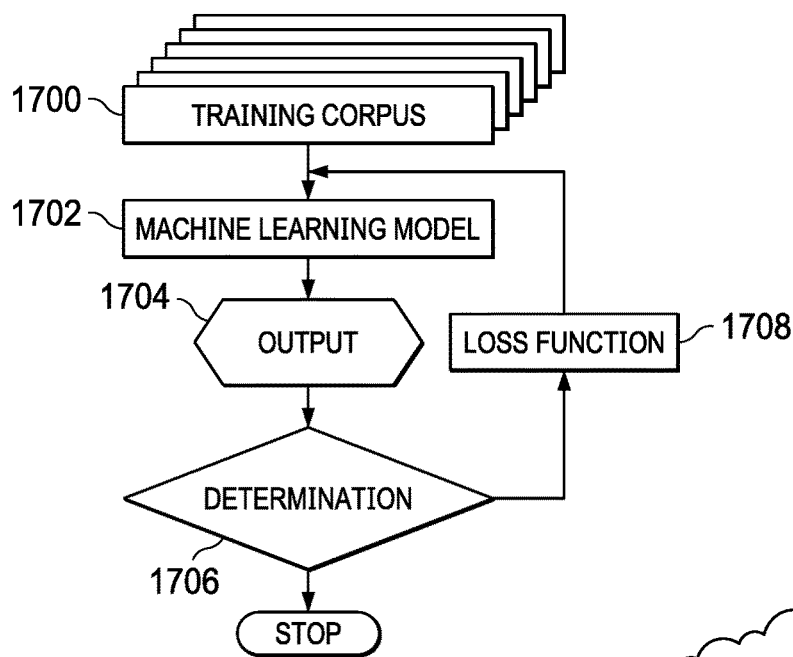
FIG. 17 shows a method of training a machine learning model, in accordance with one or more embodiments.

Attention is now turned to FIG. 17. FIG. 17 shows a method of training a machine learning model, in accordance with one or more embodiments. The method shown in FIG. 17 may be used to train a machine learning model, such as the machine learning model executable (140) in FIG. 1 or the various networks described with respect to FIG. 7 or FIG. 11 or elsewhere.

At step 1700, a corpus is received, the corpus including data, including underlying data as well as constraints, for which the optimal vehicle action (i.e., machine learning model output) is already known. Thus, the corpus may be referred to an annotated corpus. In other words, the computer scientist already knows what the final recommended action should be, even before the machine learning model takes as input the known data and produces a calculated recommended action. The corpus may be received by a training application being executed by a processor.

At step 1702, at least part of the corpus is input as a vector into a machine learning model. The machine learning model has several layers that perform a correlation between the available data and pre-designated action recommendations. The corpus may be input as a vector by first embedding the corpus in the form of a vector. Embedding may be accomplished by another machine learning process or some other rule-based process, not described herein, which translates data in the corpus into numbers that form the values of the features in the vector.

At step 1704, a probability is determined, based on the underlying data, for each of the pre-designation action recommendations. The determination is performed by the layers in the machine learning model during execution of the machine learning model. The layers acting in concert assign a probability, which may be expressed as a number between zero and one, to one or more of the features in the vector. Those probabilities that exceed a threshold value, such as but not limited to 0.5, may be marked as recommended actions. Thus, in one example, a recommendation to fire a weapon at Target A is assigned a probability of at least 0.95, and thus firing at Target A is designated as a recommended action.

At step 1706, a determination is made of whether the predicted sensor type corresponds to the known sensor type. If the predicted sensor type is the same as the known sensor type, then the process terminates.

At step 1708, a loss function is calculated. The loss function is calculated by comparing and evaluating a difference between the probability the machine learning model predicted for the most likely sensor type candidate at step 1704, and the probability that the machine learning model predicted for the known sensor type. A weighted formula may be applied to the difference in some embodiments. The difference in probability reflects an error in the machine learning model at step 1702.

For example, the recommended action may have been to fire at Target A. However, the computer scientist already knew that firing at Target B was the optimal recommendation. Thus, the determination at step 1706 is that an adjustment will be made to the machine learning model (at step 1702) so that, in the next iteration of training, firing Target B should be the recommended action.

The difference in probability between the two actions (firing at Target A and firing at Target B) is the basis for calculating the loss function at step 1708. The loss function itself is one or more commands to change one or more parameters of the machine learning model at step 1702. The parameters change how the layers interact to form the probabilities described above. Thus, the result of applying the loss function at step 1708 to the machine learning model at step 1702 is to form a new or revised machine learning model.

The process is then repeated. The training corpus at step 1700 is applied to the revised machine learning mode, the output is generated, and a determination is made whether the output matches the known result. The process continues to repeat until convergence has been achieved, whereupon the method of FIG. 17 terminates. Convergence occurs when, even after the loss function has been applied at step 1708, the output of the machine learning model at step 1704 no longer improves. Convergence also occurs when the output at step 1704 exactly equals the known output.

Figure 18B:
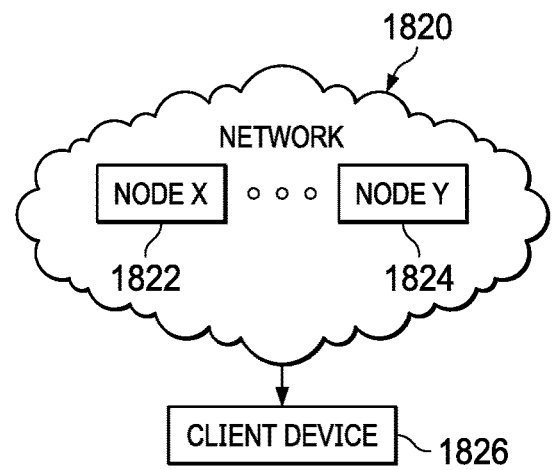
FIG. 18A and FIG. 18B show a computing environment, in accordance with one or more embodiments.
Figure 18A:
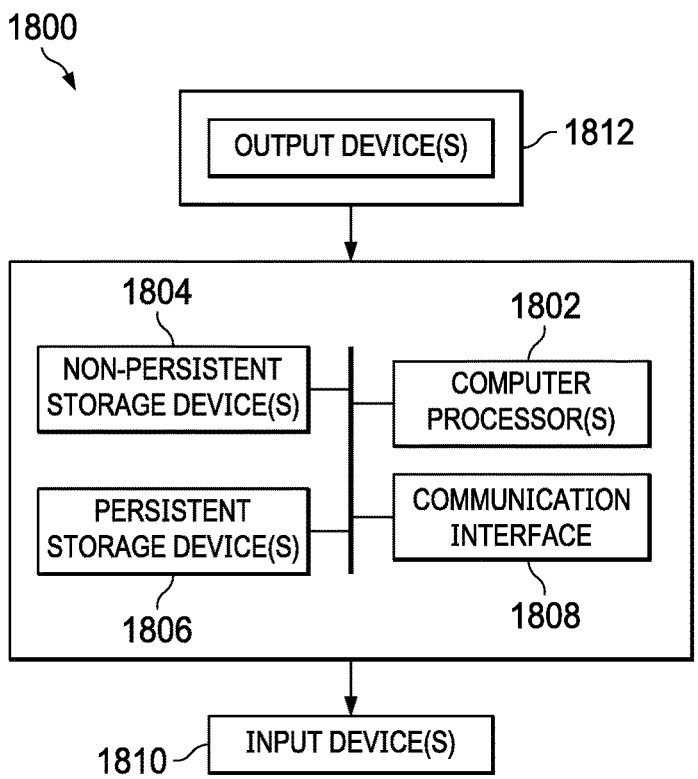

FIG. 18A and FIG. 18B are examples of a computing system and a network, in accordance with one or more embodiments. The one or more embodiments may be implemented on a computing system specifically designed to achieve an improved technological result. When implemented in a computing system, the features and elements of the disclosure provide a significant technological advancement over computing systems that do not implement the features and elements of the disclosure. Any combination of mobile, desktop, server, router, switch, embedded device, or other types of hardware may be improved by including the features and elements described in the disclosure. For example, as shown in FIG. 18A, the computing system (1800) may include one or more computer processor(s)

(1802), non-persistent storage device(s) (1804) (e.g., volatile memory, such as random access memory (RAM), cache memory), persistent storage device(s) (1806) (e.g., a hard disk, an optical drive such as a compact disk (CD) drive or digital versatile disk (DVD) drive, a flash memory, etc.), a communication interface (1808) (e.g., Bluetooth interface, infrared interface, network interface, optical interface, etc.), and numerous other elements and functionalities that implement the features and elements of the disclosure.

The computer processor(s) (1802) may be an integrated circuit for processing instructions. For example, the computer processor(s) (1802) may be one or more cores or micro-cores of a processor. The computing system (1800) may also include one or more input device(s) (1810), such as a touchscreen, a keyboard, a mouse, a microphone, a touchpad, an electronic pen, or any other type of input device.

The communication interface (1808) may include an integrated circuit for connecting the computing system (1800) to a network (not shown) (e.g., a local area network (LAN), a wide area network (WAN) such as the Internet, a mobile network, or any other type of network) and/or to another device, such as another computing device.

Further, the computing system (1800) may include one or more output device(s) (1812), such as a screen (e.g., a liquid crystal display (LCD), a plasma display, a touchscreen, a cathode ray tube (CRT) monitor, a projector, or other display device), a printer, an external storage, or any other output device. One or more of the output device(s) (1812) may be the same or different from the input device(s) (1810). The input and output device(s) (1810 and 1812) may be locally or remotely connected to the computer processor(s) (1802), the non-persistent storage device(s) (1804), and the persistent storage device(s) (1806). Many different types of computing systems exist, and the aforementioned input and output device(s) (1810 and 1812) may take other forms.

Software instructions in the form of computer readable program code to perform the one or more embodiments may be stored, in whole or in part, temporarily or permanently, on a non-transitory computer readable medium such as a CD, a DVD, a storage device, a diskette, a tape, flash memory, physical memory, or any other computer readable storage medium. Specifically, the software instructions may correspond to computer readable program code that, when executed by a processor(s), is configured to perform one or more embodiments.

The computing system (1800) in FIG. 18A may be connected to or be a part of a network. For example, as shown in FIG. 18B, the network (1820) may include multiple nodes (e.g., node X (1822), node Y (1824)). Each node may correspond to a computing system, such as the computing system (1800) shown in FIG. 18A, or a group of nodes combined may correspond to the computing system (1800) shown in FIG. 18A. By way of an example, the one or more embodiments may be implemented on a node of a distributed system that is connected to other nodes. By way of another example, the one or more embodiments may be implemented on a distributed computing system having multiple nodes, where each portion of the one or more embodiments may be located on a different node within the distributed computing system. Further, one or more elements of the aforementioned computing system (1800) may be located at a remote location and connected to the other elements over a network.

Although not shown in FIG. 18B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (1822), node Y (1824)) in the network (1820) may be configured to provide services for a client device (1826). For example, the nodes may be part of a cloud computing system. The nodes may include functionality to receive requests from the client device (1826) and transmit responses to the client device (1826). The client device (1826) may be a computing system, such as the computing system (1800) shown in FIG. 18A. Further, the client device (1826) may include and/or perform all or a portion of the one or more embodiments.

The computing system (1800) or group of computing systems described in FIGS. 18A and 18B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the one or more embodiments. The processes may be part of the same or different application and may execute on the same or different computing system.

Rather than or in addition to sharing data between processes, the computing system performing one or more embodiments may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing the one or more embodiments, may extract one or more data items from the obtained data. For example, the extraction may be performed as follows by the computing system (1800) in FIG. 18A. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail-such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as eXtensible Markup Language (XML)).

The extracted data may be used for further processing by the computing system. For example, the computing system (1800) of FIG. 18A, while performing the one or more embodiments, may perform data comparison. Data comparison may be used to compare two or more data values (e.g., A, B). For example, one or more embodiments may determine whether A>B, A=B, A!=B, A<B, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if A>B, B may be subtracted from A (i.e., A−B), and the status flags may be read to determine if the result is positive (i.e., if A>B, then A−B>0). In one or more embodiments, B may be considered a threshold, and A is deemed to satisfy the threshold if A=B or if A>B, as determined using the ALU. In one or more embodiments, A and B may be vectors, and comparing A with B requires comparing the first element of vector A with the first element of vector B, the second element of vector A with the second element of vector B, etc. In one or more embodiments, if A and B are strings, the binary values of the strings may be compared.

The computing system (1800) in FIG. 18A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, data containers (a database, a table, a record, a column, a view, etc.), identifiers, conditions (comparison operators), functions (e.g. join, full join, count, average, etc.), sorts (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system (1800) of FIG. 18A may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions presents only a few examples of functions performed by the computing system (1800) of FIG. 18A and the nodes (e.g., node X (1822), node Y (1824)) and/or client device (1826) in FIG. 18B. Other functions may be performed using the one or more embodiments.

While the one or more embodiments have been described with respect to a limited number of embodiments, those skilled in the art, having benefit of this disclosure, will appreciate that other embodiments can be devised which do not depart from the scope of the one or more embodiments as disclosed herein. Accordingly, the scope of the one or more embodiments should be limited only by the attached claims.

What is claimed is:

1. A method comprising:
receiving a pre-determined constraint on a plurality of user actions;
generating a constraint vector based on the pre-determined constraint;
inputting the constraint vector into a machine learning model;
generating a first output from the machine learning model by executing the machine learning model using the constraint vector as a first input to the machine learning model;
converting the constraint vector into a legal action mask;
generating a probability vector by executing a masked softmax operator, wherein:
the masked softmax operator takes, as a second input, the first output,
the masked softmax operator takes, as a third input, the legal action mask, and
the masked softmax operator generates, as a second output, the probabilities vector; and
generating a plurality of action outputs by applying a sampling system to the probability vector, wherein the plurality of action outputs comprise a subset of the plurality user actions, and wherein the subset includes only allowed user actions.

2. The method of claim 1, wherein generating the constraint vector comprises:
converting the pre-determined constraint into a first machine learning vector;
receiving, from a user interface, a user-designated constraint to the plurality of user actions, the user-designated constraint received from a user;
converting the user-designated constraint into a second machine learning vector; and
combining the first machine learning vector and the second machine learning vector into the constraint vector.

3. The method of claim 2, wherein combining comprises concatenating the first machine learning vector and the second machine learning vector.

4. The method of claim 1, further comprising:
displaying, on a display device, both the subset of the plurality of user actions and the allowed user actions; and
highlighting the subset of the plurality of user actions.

5. The method of claim 1, further comprising:
disabling a control of a machine, wherein use of the control is not one of the allowed user actions.

6. The method of claim 2, wherein the pre-determined constraint comprises at least one of sensor data received contemporaneously with receiving the user designated constraint, sensor data received prior to receiving the user designated constraint, a constraint received over a communication device, and a pre-mission constraint related to a mission assigned to the user.

7. The method of claim 1, wherein:
the legal action mask comprises a third vector having features comprising zeros or ones,
a corresponding constrained action is set to zero, and
a corresponding allowed action is set to one.

8. The method of claim 1, further comprising:
transmitting the subset of the plurality of user actions to a computer operated by a second user; and
displaying constraints to a second plurality of user actions related to the second user, based on the subset of the plurality of user actions.

9. The method of claim 1, wherein:
the pre-determined constraint comprises mission constraints that constrain the plurality of user actions based on forbidden actions specified by a second user.

10. The method of claim 1, wherein:
the pre-determined constraint comprises system constraints that constrain the plurality of user actions based on sensed physical parameters of a vehicle operated at least in part by the user.

11. The method of claim 10, wherein:
the sensed physical parameters are received from at least one sensor operably connected to the vehicle.

12. The method of claim 1, wherein:
adding an updated constraint, received after receiving the pre-determined constraint, to the pre-determined constraint.

13. The method of claim 1, wherein:
the pre-determined constraint comprises mission constraints that constrain the plurality of user actions based on forbidden actions specified by a second user;
the pre-determined constraint further comprises system constraints that constrain the plurality of user actions based on sensed physical parameters of a vehicle operated at least in part by the user;
the sensed physical parameters are received from at least one sensor operably connected to the vehicle; and
the pre-determined constraint further comprises an updated constraint received after initially receiving the pre-determined constraint.

14. A method comprising:
receiving a pre-determined constraint on a plurality of user actions;
converting the pre-determined constraint into a first machine learning vector;
receiving, from a user interface, a user-designated constraint to the plurality of user actions, the user-designated constraint received from a user;
converting the user-designated constraint into a second machine learning vector;
generating a constraint vector by concatenating the first machine learning vector and the second machine learning vector;
inputting the constraint vector into a first machine learning model;
generating a first output from the first machine learning model by executing the first machine learning model using the constraint vector as a first input to first the machine learning model;
converting the constraint vector into a legal action mask;
generating a first probability vector by executing a masked softmax operator, wherein:
the masked softmax operator takes, as a second input, the first output,
the masked softmax operator takes, as a third input, the legal action mask, and
the masked softmax operator generates, as a second output, the first probabilities vector;
generating a plurality of action outputs by applying a sampling system to the first probabilities vector, wherein the plurality of action outputs comprise a subset of the plurality of user actions, and wherein the subset includes only allowed user actions;
transmitting the constraint vector to a second vehicle operated by a second user;
calculating a second probabilities vector using a second machine learning model, wherein the second machine learning model uses at least the constraint vector as input; and
generating a plurality of second action outputs by applying a second sampling system to the second probabilities vector, wherein the plurality of second action outputs comprise a second subset of a plurality of second user actions of a second user operating the second vehicle, and wherein the second subset includes only second allowed user actions of the second user.

15. The method of claim 14, further comprising:
disabling at least a portion of a sub-system of the second vehicle based on the second subset.

16. The method of claim 14, wherein:
calculating the second probabilities vector further comprises using a second pre-determined constraint as input to the second machine learning model; and
the second pre-determined constraint comprises mission constraints that constrain the plurality of second user actions based on forbidden actions specified by a third user.

17. The method of claim 14, wherein:
calculating the second probabilities vector further comprises using a second pre-determined constraint as input to the second machine learning model;
the second pre-determined constraint comprises system constraints that constrain the plurality of second user actions based on second sensed physical parameters of the second vehicle; and
the second sensed physical parameters are received from second sensors operably connected to the second vehicle.

18. The method of claim 14, wherein:
calculating the second probabilities vector further comprises using a second pre-determined constraint as input to the second machine learning model; and
the second pre-determined constraint comprises a second updated constraint received by the second vehicle after receiving the second pre-determined constraint.

19. The method of claim 14, wherein the pre-determined constraint comprises at least one of sensor data received contemporaneously with receiving a user designated constraint, sensor data received prior to receiving the user designated constraint, a constraint received over a communication device, and a pre-mission constraint related to a mission assigned to the user.

20. The method of claim 14, wherein:
the legal action mask comprises a third vector having features comprising zeros or ones,
a corresponding constrained action is set to zero, and
a corresponding allowed action is set to one.

* * * * *